US012704060B2

(12) United States Patent
Omar

(10) Patent No.: US 12,704,060 B2
(45) Date of Patent: Aug. 11, 2026

(54) MULTI-CASING EVALUATION USING MULTI-FREQUENCY, NON-COLLOCATED, INDUCTION MEASUREMENTS

(71) Applicant: Schlumberger Technology Corporation, Sugar Land, TX (US)

(72) Inventor: Saad Omar, Cambridge, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 147 days.

(21) Appl. No.: 18/764,747

(22) Filed: Jul. 5, 2024

(65) Prior Publication Data

US 2026/0009322 A1 Jan. 8, 2026

(51) Int. Cl.

| | |
|---|---|
| ***E21B 47/085*** | (2012.01) |
| ***E21B 47/00*** | (2012.01) |
| ***G01N 27/9093*** | (2021.01) |

(52) U.S. Cl.

CPC .......... *E21B 47/085* (2020.05); *E21B 47/006* (2020.05); *G01N 27/9093* (2013.01)

(58) Field of Classification Search

CPC .. E21B 47/085; E21B 47/006; G01N 27/9093

See application file for complete search history.

(56) References Cited

U.S. PATENT DOCUMENTS 4,843,317 A * 6/1989 Dew ..................... E21B 47/085 324/229

7,960,969 B2 6/2011 Mouget (Continued)

FOREIGN PATENT DOCUMENTS

| | | | | |
|---|---|---|---|---|
| WO | WO-2016007307 A1 * | 1/2016 | ......... | G01N 27/9046 |
| WO | WO-2016007380 A1 * | 1/2016 | ............. | G01N 27/90 |
| WO | 2024108151 A1 | 5/2024 | | |

OTHER PUBLICATIONS

Larbi Zeghlache, Mohamed , Bazaid, Abdulaziz , Hill, Freeman , and Nacer Guergueb. "Comprehensive Casing Corrosion Inspection Using Multi-Frequency Array EM Technology." Paper presented at the SPE International Oilfield Corrosion Conference and Exhibition, Virtual, Jun. 2021 (Year: 2021).*

(Continued)

*Primary Examiner* — Daniel R Miller

(74) *Attorney, Agent, or Firm* — Jeffrey D. Frantz

(57) ABSTRACT

Techniques and apparatus for evaluating sensor placement and frequency selection for an electromagnetic inspection tool, and determining casing count and casing sizes in a multi-casing well are described. The electromagnetic inspection tool includes a transmitter and multiple receivers configured to operate at one or more frequencies. Each receiver is located at a different spacing from the transmitter. At least one of a casing count for a well or a respective size of each casing in the well is determined using multi-frequency, non-collocated induction measurements obtained via the electromagnetic inspection tool. The size of an innermost casing may be determined based on slope(s) of high frequency response(s) at spacings in a direct coupling zone of an electromagnetic field distribution. Each size of an outer casing(s) may be determined based in part on null frequency locations within the frequency domain responses at spacings in the transition zone of the electromagnetic field distribution.

19 Claims, 22 Drawing Sheets

(56) References Cited

U.S. PATENT DOCUMENTS

| | | | | |
|---|---|---|---|---|
| 8,332,191 | B2 | 12/2012 | Rosthal | |
| 8,614,578 | B2 | 12/2013 | Gao | |
| 8,958,989 | B2 | 2/2015 | Legendre | |
| 9,715,034 | B2 | 7/2017 | Omeragic | |
| 10,082,593 | B2 | 9/2018 | Yu | |
| 10,487,643 | B2 | 11/2019 | San Martin | |
| 10,655,452 | B2 | 5/2020 | Khalaj Amineh | |
| 2010/0017137 | A1* | 1/2010 | Legendre | G01N 27/9046 702/11 |
| 2013/0193953 | A1 | 8/2013 | Yarbro | |
| 2015/0119601 | A1 | 4/2015 | Liao | |
| 2016/0061776 | A1 | 3/2016 | Aslanyan | |
| 2017/0114628 | A1* | 4/2017 | Khalaj Amineh | E21B 47/007 |
| 2017/0167241 | A1* | 6/2017 | Wu | G01V 3/34 |
| 2017/0176629 | A1 | 6/2017 | Omeragic | |
| 2017/0314387 | A1 | 11/2017 | Yang | |
| 2020/0284137 | A1 | 9/2020 | Khalaj Amineh | |
| 2021/0239874 | A1* | 8/2021 | Fouda | G01B 7/13 |
| 2023/0213681 | A1 | 7/2023 | Fouda | |
| 2024/0240551 | A1 | 7/2024 | Omar | |

OTHER PUBLICATIONS

Brill, T.M., Electromagnetic Casing Inspection Tool for Corrosion Evaluation, International Petroleum Technology Conference, Feb. 7, 2012, 14 Pages.

* cited by examiner

MULTI-CASING EVALUATION USING MULTI-FREQUENCY, NON-COLLOCATED, INDUCTION MEASUREMENTS

BACKGROUND

Field of the Disclosure

The present disclosure relates to evaluating multi-casing wells using multi-frequency, non-collocated, induction measurements. More specifically, the present disclosure provides techniques and apparatus for determining sensor placement and frequency selection for an electromagnetic inspection tool, and determining casing count and casing sizes in a multi-casing well using multi-frequency, non-collocated, induction measurements obtained via the electromagnetic inspection tool.

Description of Related Art

In well logging or inspection via electromagnetic (EM) field testing, such as remote field eddy current (RFEC) testing, a field-testing probe is slid within an interior diameter of a conductive casing or tubular. A transmitter of the field-testing probe induces an EM field that interacts with the casing. The EM field may vary depending on thickness and/or corrosion in the casing. Receivers may detect these variations in the EM field. Based on these detected variations, the effective thickness and/or corrosion of the casing may be determined. However, conventional EM field testing generally focuses on determining the individual pipe thicknesses. Accordingly, there exists a need for further improvements in multi-casing evaluations based on RFEC measurements.

SUMMARY

One embodiment of the present disclosure described herein is a method. The method generally includes operating an electromagnetic (EM) inspection tool in a well including a plurality of nested casings. The EM inspection tool includes a transmitter and a plurality of non-collocated receivers configured to operate at one or more frequencies. Each of the plurality of non-collocated receivers is located at a different spacing with respect to the transmitter. The method also includes obtaining, using the EM inspection tool, a set of induction, multi-spacing, multi-frequency measurements of the plurality of nested casings. The method further includes determining at least one of a number of the plurality of nested casings or a respective size of each casing of the plurality of nested casings, based on the set of induction, multi-spacing, multi-frequency measurements.

Another embodiment of the present disclosure described herein is a system. The system includes a plurality of nested casings disposed in a well, an electromagnetic (EM) inspection tool disposed in the plurality of nested casings, and a control system communicatively coupled to the EM inspection tool. The EM inspection tool includes a transmitter and a plurality of non-collocated receivers. Each of the plurality of non-collocated receivers is located at a different spacing with respect to the transmitter. The control system includes one or more memories collectively storing instructions and one or more processors coupled to the one or more memories. The one or more processors are collectively configured to execute the instructions to cause the control system to perform an operation. The operation includes obtaining, using the EM inspection tool, a set of induction, multi-spacing, multi-frequency measurements of the plurality of nested casings. The operation also includes determining at least one of a number of the plurality of nested casings or a respective size of each casing of the plurality of nested casings, based on the set of induction, multi-spacing, multi-frequency measurements.

Another embodiment of the present disclosure described herein is a non-transitory computer-readable medium. The non-transitory computer-readable medium includes computer-executable instructions that, when executed by one or more processors of a computing system, cause the computing system to perform an operation. The operation includes operating an electromagnetic (EM) inspection tool in a well including a plurality of nested casings. The EM inspection tool includes a transmitter and a plurality of non-collocated receivers configured to operate at one or more frequencies. Each of the plurality of non-collocated receivers is located at a different spacing with respect to the transmitter. The operation also includes obtaining, using the EM inspection tool, a set of induction, multi-spacing, multi-frequency measurements of the plurality of nested casings. The operation further includes determining at least one of a number of the plurality of nested casings or a respective size of each casing of the plurality of nested casings, based on the set of induction, multi-spacing, multi-frequency measurements.

Another embodiment of the present disclosure described herein is a method. The method generally includes determining a plurality of electromagnetic (EM) field distributions for a plurality of casing configurations for a set of well completions. The method also includes determining a plurality of receiver locations for a respective plurality of receivers of an EM inspection tool, based on the plurality of EM field distributions. The method further includes assigning the plurality of casing configurations to the EM inspection tool.

Another embodiment of the present disclosure described herein is a system. The system includes one or more memories collectively storing instructions and one or more processors coupled to the one or more memories. The one or more processors are collectively configured to execute the instructions to cause the system to perform an operation. The operation includes determining a plurality of electromagnetic (EM) field distributions for a plurality of casing configurations for a set of well completions. The operation also includes determining a plurality of receiver locations for a respective plurality of receivers of an EM inspection tool, based on the plurality of EM field distributions. The operation further includes assigning the plurality of casing configurations to the EM inspection tool.

Another embodiment of the present disclosure described herein is a non-transitory computer-readable medium. The non-transitory computer-readable medium includes computer-executable instructions that, when executed by one or more processors of a computing system, cause the computing system to perform an operation. The operation includes determining a plurality of electromagnetic (EM) field distributions for a plurality of casing configurations for a set of well completions. The operation also includes determining a plurality of receiver locations for a respective plurality of receivers of an EM inspection tool, based on the plurality of EM field distributions. The operation further includes assigning the plurality of casing configurations to the EM inspection tool.

The following description and the appended figures set forth certain features for purposes of illustration.

BRIEF DESCRIPTION OF DRAWINGS

Various embodiments in accordance with the present disclosure will be described with reference to the drawings, where like designations denote like elements. Note that the appended drawings illustrate typical embodiments and are therefore not to be considered limiting; other equally effective embodiments are contemplated.

DETAILED DESCRIPTION

Figure 1:
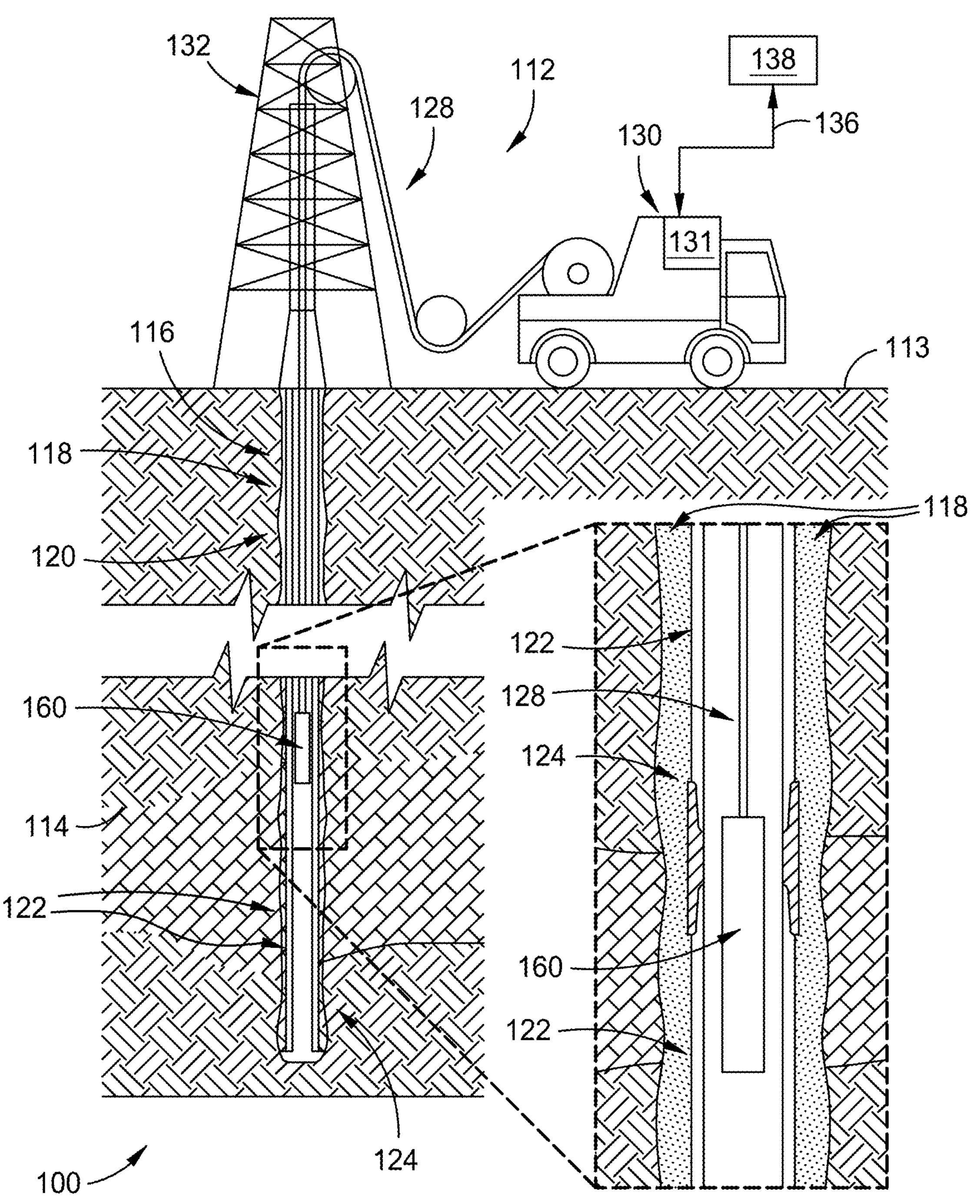
FIG. 1 is a schematic diagram of at least a portion of an example system, according to various embodiments.

One challenge associated with managing oil and gas assets is that, in some cases, information associated with one or more properties of a well can be lost over the lifecycle of the well for a variety of reasons. For example, the departure or reassignment of a member associated with the well, change of a management team for the well, and/or change in ownership of the well can often lead to the loss of access to critical information, such as the number of casings within the well and the size of each casing in the well, as illustrative examples. In such cases, the new member, new management team, and/or new owner may not have complete knowledge of the information, impacting the ability to assess the economic potential, plan development, and/or accurately monitor reservoir performance.

The disclosure provides techniques, methods, systems, apparatus, and computer readable media for determining casing count and the size of each casing in a multi-casing well using multi-frequency, non-collocated, induction measurements obtained via an EM inspection tool.

In certain embodiments, an EM inspection tool is inserted into a well including nested casings (also referred to herein as nested tubulars or nested pipes). For example, the EM inspection tool may be inserted into an interior diameter of an inner casing (or other conductive tubular) of the nested casings. The EM inspection tool includes a transmitter (with a transmitter coil) and one or more receivers (each with a respective receiver coil). The one or more receivers may include at least one receiver that is collocated with the transmitter, at least one receiver that is non-collocated with the transmitter, or a combination thereof. Each receiver may be positioned at a respective axial distance (or spacing) (e.g., denoted as "d," where a value of "d" is equal to zero representing a collocated receiver or is greater than zero representing a non-collocated receiver) from the transmitter.

In certain embodiments, the EM inspection tool is controlled to measure and generate data including multi-frequency, non-collocated (e.g., multiple spacing), induction measurements for the nested casings. For example, the transmitter of the EM inspection tool may be excited by a time-domain pulse and a series of continuous wave (CW) multi-frequency excitations. For each excitation frequency, the transmitter coil current generates a primary EM field that is distributed in space within the nested casings. The primary EM field from the transmitter coil induces eddy currents in the nested casings, and the eddy currents produce a corresponding one or more returning (secondary) EM fields that are distributed in space within the nested casings. The receiver(s) of the EM inspection tool may detect and measure the primary EM fields generated by the transmitter, the returning (secondary) EM fields, or a combination thereof, to generate data including multi-frequency, non-collocated (e.g., multiple spacing), induction measurements. For example, in certain embodiments, the EM inspection tool includes multiple receivers positioned at various axial distances (or spacings) from the transmitter such that the multiple receivers measure the primary EM fields generated by the transmitter, the returning (secondary) EM fields, or a combination thereof, and generate the multi-frequency, non-collocated, induction data. For instance, the multi-frequency, non-collocated, induction measurements may include, for each receiver, a respective set of frequency domain responses to the primary EM fields generated by the transmitter, the returning (secondary) EM fields, or a combination thereof.

As described in greater detail below, in some cases, the multi-frequency, non-collocated induction measurements from the receivers may include frequency domain responses associated with one or more EM field distributions in one or more zones, including, for example, a direct coupling (or near-field) zone, a transition zone, and a remote field zone. In the direct coupling zone, the strength of the primary EM field(s) generated by the transmitter may be greater than the strength of the returning (secondary) EM field(s). In the transition zone, the strength of the primary EM field(s) generated by the transmitter may be approximately equal to the strength of the returning (secondary) EM field(s). In the remote field zone, the strength of the returning (secondary) EM field(s) may be greater than the strength of the primary EM field(s) generated by the transmitter.

In certain embodiments, the number of casings within a well is determined by analyzing one or more of the EM field distributions in the one or more zones within the multi-frequency, non-collocated, induction measurements. For example, as described below, the magnitude and/or phase of the measured impedance (e.g., Z=V/I, where V is voltage in volts and I is current in amperes) in the remote field zone may give a clear separation of responses for a fixed count of the number of casings that is independent of casing eccentering, tool eccentering (e.g., EM inspection tool eccentering), and casing properties. In certain embodiments, the remote field zone occurs at receiver spacings that are greater than or equal to twice the maximum outer casing diameter for the well.

In certain embodiments, the size (e.g., outer diameter) of each casing within the well is determined by analyzing one or more of the EM field distributions in the one or more zones within the multi-frequency, non-collocated, induction measurements. For example, the size of the innermost casing within the well may be determined based on the slope(s) of the high frequency response(s) at spacings in the direct coupling zone where the primary EM field (or direct coupling) dominates.

For outer casings, the respective size of each outer casing may be determined based on at least one of (i) frequency domain responses at spacings in the transition zone or (ii) one or more null frequency locations within the frequency domain responses at spacings in the transition zone. For example, as described in greater detail below, for each outer casing, the null frequency locations may be shifted to a lower frequency for each of the smaller outer casings than for a larger outer casing, forming the basis for sequentially resolving each of the outer casings from a discrete and finite number of outer casings. For instance, an outer "second" casing of a first size may be resolved from an outer "second" casing of a second, larger size; then an outer "third" casing of a first size may be resolved from an outer "third" casing of a second size; and so on.

The disclosure herein also provides techniques, methods, systems, apparatus, and computer readable media for evaluating and determining sensor placement and frequency selection for an EM inspection tool. For example, in certain embodiments, a receiver location for each respective receiver of the EM inspection tool is determined based on analyzing data including one or more EM field distributions for various casing configurations for multiple (e.g., arbitrary) well completions. The data, for example, may be obtained from simulations, measurements in the field, or a combination thereof. In certain embodiments, the receiver locations are determined, such that (i) a frequency domain response of a spacing of at least one receiver includes a frequency band that is associated with the direct coupling zone, (ii) a frequency domain response of a spacing of at least one receiver incudes a frequency band associated with the transition zone, constituting the null response for at least one casing configuration at that spacing, (iii) a frequency domain response of a spacing of at least one receiver includes a frequency band that is associated with the remote field zone, or (iv) a combination thereof.

The following description includes embodiments of the best mode presently contemplated for practicing the described implementations. This description is not to be taken in a limiting sense, but rather is made merely for the purpose of describing the general principles of the implementations. The scope of the described implementations should be ascertained with reference to the issued claims.

Although the terms "first," "second," "third," etc., may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms, when used herein, do not imply a sequence or order unless clearly indicated by the context. Thus, a first element, component, region, layer, or section discussed herein could be termed a second element, component, region, layer, or section without departing from the teachings of the example embodiments.

As used herein, a hyphenated form of a reference numeral refers to a specific instance of an element and the unhyphenated form of the reference numeral refers to the collective element. Thus, for example, device "12-1" refers to an instance of a device class, which may be referred to collectively as devices "12" and any one of which may be referred to generically as a device "12".

Example System for Evaluating a Multi-Casing Well

FIG. 1 is a schematic diagram of at least a portion of an example implementation of a system 100 for evaluating a multi-casing well using a downhole EM inspection tool 160, according to various embodiments. As shown, surface equipment 112 is located on a wellsite surface 113 above a geological formation 114 into which a wellbore 116 extends from the wellsite surface 113. An annular fill 118 has been used to seal an annulus 120 between the wellbore 116 and casings (e.g., tubulars) 122, such as via cementing operations. The EM inspection tool 160 may be centered or decentered (e.g., eccentered), such that a measuring and/or detecting device (e.g., a transmitter or a receiver) of the EM inspection tool 160 is positioned centrally or off-center relative to a central longitudinal axis of the casings 122.

The casings 122 may be coupled together by collars 124. The casings 122 represent lengths of pipe including threads and/or other means for connecting each end to threads and/or other connection means of an adjacent collar 124 and/or casing 122. Each casing 122 and/or collar 124 may be made of steel and/or other electrically conductive materials able to withstand a variety of forces, such as collapse, burst, and tensile failure, as well as chemically-aggressive fluid. Each casing 122 and/or collar 124 may have magnetic properties and be affected by an alternating EM current.

Figure 3:
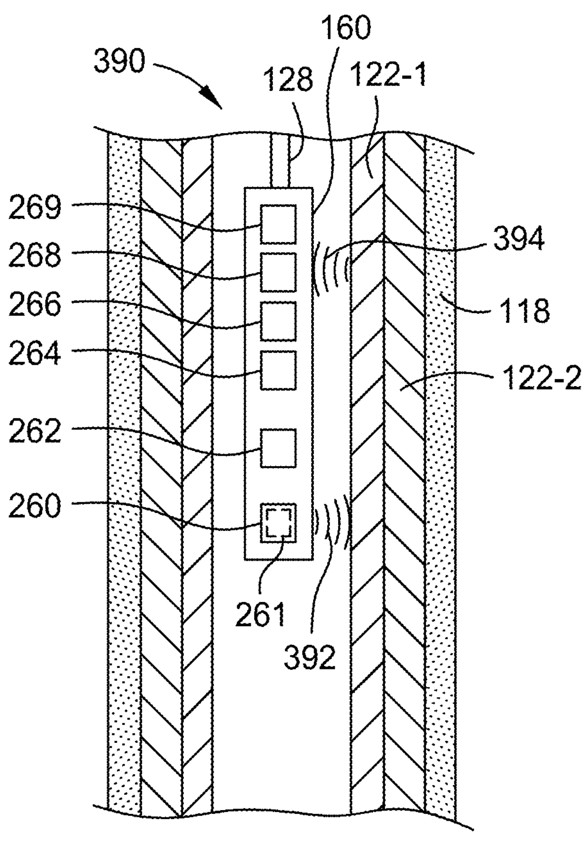
FIG. 3 depicts a schematic diagram of an example implementation of the EM inspection tool shown in FIG. 2, according to various embodiments.

The surface equipment 112 may carry out various well-inspection (or well-logging) operations to detect properties (e.g., pipe count and/or sizes) of the casings 122, including implementations in which the casings 122 are concentrically nested, as shown in FIG. 3, for example. The well-inspection operations may determine the number of casings 122 and/or the size of each casing 122 by using the EM inspection tool 160.

The EM inspection tool 160 may be conveyed within the wellbore 116 by a cable 128. Such cable 128 may include one or more mechanical cables, electrical cables, and/or electro-optical cables that include one or more fiber-optic lines protected against the harsh environment of the wellbore 116. In certain embodiments, the EM inspection tool 160 is conveyed using other conveyance means, such as coiled tubing or a tractor.

The EM inspection tool 160 may generate a time-varying magnetic field signal that interacts with the casings 122. The EM inspection tool 160 may be energized from the surface (e.g., via the cable 128) or have its own internal power used to emit the time-varying magnetic field signal via one or more EM sources (e.g., transmitters). The time-varying magnetic field signal may travel outward from the EM inspection tool 160 through and along the casings 122. The time-varying magnetic field signal may generate eddy currents in the casings 122, which produce corresponding returning magnetic field signals measured as magnetic field anomalies by one or more receivers (e.g., sensors) in the EM inspection tool 160. In some cases, combined measurements (e.g., at remote-field with RFEC, near field, or transition zone) of multiple receivers may be used to create a data log and to determine the number of casings 122 and/or the size of each casing 122 using EM and/or other suitable field-testing analyses.

The EM inspection tool 160 may be deployed inside the wellbore 116 by the surface equipment 112, which may include a vehicle 130 and a deploying system such as a drilling rig, workover rig, platform, derrick, and/or other surface structure 132. Data (e.g., inspection data) related to the casings 122 gathered by the EM inspection tool 160 may be transmitted to the surface and/or stored in the EM inspection tool 160 (and/or one or more storage systems) for later processing and analysis. The vehicle 130 may be fitted with and/or communicate with a data processing system 138 via a communication component 131 to perform data collection and analysis. When the EM inspection tool 160 provides measurements to the surface equipment 112 (e.g., through the cable 128), the surface equipment 112 may pass the measurements as EM inspection evaluation data 136 to a data processing system 138.

The data processing system 138 may obtain the measurements from the EM inspection tool 160 as raw data. In certain embodiments, the measurements are processed or pre-processed by the EM inspection tool 160 before being sent to the data processing system 138. Processing of the measurements may incorporate using and/or obtaining other measurements, such as from ultrasonic, caliper, and/or other EM logging techniques to better constrain unknown parameters of the casings. Accordingly, the data processing system 138 and/or the EM inspection tool 160 may be utilized in acquiring additional information about the casings 122 and/or the wellbore 116, such as a number of casings 122, size (e.g., outer diameter) of each casing 122, nominal thickness of each casing 122, centering of the casings 122 relative to the wellbore 116, centering of the EM inspection tool 160 within the wellbore 116, electromagnetic and/or ultrasonic properties of the casings 122, ambient and/or wellbore temperature, caliper measurements, and/or other parameters (or properties) of the casings 122.

Figure 2:
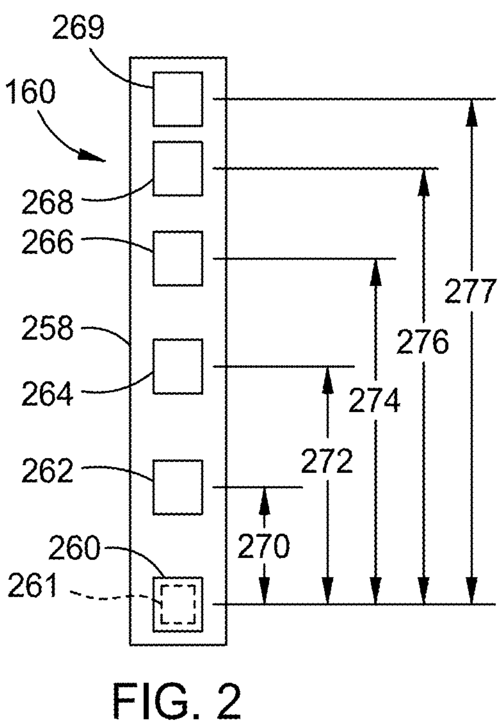
FIG. 2 depicts a schematic diagram of at least a portion of an example implementation of an EM inspection tool, according to various embodiments.

FIG. 2 depicts a schematic diagram of at least a portion of an example implementation of the EM inspection tool 160 that may be utilized for casing and other casing inspection within the scope of the present disclosure. The EM inspection tool 160 may include a transmitter 260, one or more collocated receivers 261, and one or more non-collocated receivers (e.g., receivers 262, 264, 266, 268, and 269). The transmitter 260, the one or more collocated receivers 261, and the one or more non-collocated receivers 262, 264, 266, 268, 269 may be enclosed within or otherwise carried with a housing 258. The housing 258 may be a pressure-resistant housing. Note, although FIG. 2 depicts the EM inspection tool 160 with a certain number of transmitters and a certain number of receivers, the EM inspection tool 160 may include any number of transmitters and any number of receivers.

The receivers 262, 264, 266, 268, and 269 may be operated based on various magnetic field detection techniques, such as coiled-winding, Hall-effect sensor, giant magneto-resistive sensor, and/or other magnetic field measuring means. The receivers 262, 264, 266, 268, and 269 may be axially aligned within the EM inspection tool 160, as depicted in the example implementation shown in FIG. 2. In certain embodiments, one or more of the receivers 262, 264, 266, 268, and 269 may be radially or transversely offset along an axis (e.g., longitudinal axis) of the EM inspection tool 160. For example, one or more of the receivers 262, 264, 266, 268, and 269 may be azimuthally offset towards or adjacent a perimeter of the EM inspection tool 160. Embodiments within the scope of the present disclosure may also include implementations using multiple transmitters, in which windings of the multiple transmitters are transverse or oblique, as in a saddle coil arrangement, which couple to the receivers or additional receiver windings.

In the example implementation shown in FIG. 2, the one or more collocated receivers 261 are located at the same location as the transmitter 260 (at zero distance or spacing from the transmitter 260), and the one or more non-collocated receivers 262, 264, 266, 268, and 269 are located at different distances or spacings away from the transmitter 260. For example, the receiver 262 is located a distance (or spacing) 270 from the transmitter 260, the receiver 264 is located a distance (or spacing) 272 from the transmitter 260, the receiver 266 is located a distance (or spacing) 274 from the transmitter 260, the receiver 268 is located a distance (or spacing) 276 from the transmitter 260, and the receiver 269 is located a distance (or spacing) 277 from the transmitter 260. In certain embodiments, the distances (or spacings) 270, 272, 274, 276, and 277 are determined based on analyzing data including one or more magnetic field distributions for various casing configurations for multiple, arbitrary, well completions, as described in greater detail herein. For example, certain embodiments provide techniques for determining the distances (or spacings) 270, 272, 274, 276, and 277 to optimize (e.g., increase) the occurrence of transition zone (and responses nulling), which may have a maximal sensitivity to various casing parameters for multi-casing completions with various tubing sizes (e.g., from 2 inches to 13 inches, and greater than 13 inches).

The receivers 262, 264, 266, 268, and 269 may detect a strength (e.g., signal amplitude) and/or a phase of the returning magnetic field from the casings 122. The EM inspection tool 160 and/or the data processing system 138 may use detected values (e.g., amplitude and/or phase values) to create a data log. Based on the data log, the EM inspection tool 160 and/or the data processing system 138 may determine a number of casings 122 and/or a size (e.g., outer diameter) of each casing 122. Various techniques, such as inversion, model searching, and simulated annealing, as illustrative, non-limiting examples, may be used to interpret the data log.

FIG. 3 depicts a schematic diagram of an example implementation of the EM inspection tool 160 shown in FIG. 2. The example implementation incudes a system 390 for determining the number of casings 122 and/or a size (e.g., outer diameter) of each casing 122. As the EM inspection tool 160 descends through the casings 122, the transmitter 260 generates a time-varying magnetic field 392 that interacts with the casings 122 made by certain conductive materials. The time-varying magnetic field 392 travels outward from the transmitter 260 and then through and along the casings 122. The time-varying magnetic field 392 generates eddy currents in the casings 122, which produce corresponding returning magnetic field 394. The returning magnetic field 394 propagates to the receivers 262, 264, 266, 268, and 269, which detect the returning magnetic field 394 and convert detection portions of the returning magnetic field 394 into corresponding signals. In some cases, depending on the distance (or spacing) of the receiver from the transmitter, a portion of the returning magnetic field 394 may arrive at the receiver with a change in strength (e.g., signal amplitude) relative to when the magnetic field 394 was induced.

In certain embodiments, the EM inspection tool 160 may include one or more transmitter coils with one or more collocated receivers wrapped on top of the transmitter and/or one or more non-collocated receiver subs. For instance, one receiver (e.g., receiver 268) may detect multiple returning magnetic fields excited by time-variant (e.g., decayed) eddy currents in multiple casings of the casings 122 and generate a set of time-domain collocated data. In some embodiments, two or more receivers may be situated at the same location and detect one or more returning magnetic fields excited by the time-variant eddy currents in one or more casings of the casings 122 and generate a second set of time-domain collocated data. In some embodiments, multiple receivers situated at different locations may detect different multiple returning magnetic fields (e.g., arriving at different receiver locations) excited by the time-variant eddy currents in the multiple casings of the casings 122 and generate a set of multi-frequency, multi-spacing, non-collocated data. The quantity of the one or more non-collocated receiver subs may be any number, such as one, three, ten, or the like. The one or more non-collocated receiver subs may include any number of non-collocated receivers. For example, a first non-collocated receiver sub may include one receiver, a second non-collocated receiver sub may include two receivers, a third non-collocated receiver sub may include 3 receivers, and a fourth non-collocated receiver sub may include 4 receivers.

In certain embodiments, the transmitter(s) 260 may be excited by a time-domain pulse excitation and a series of continuous wave (CW) multi-frequency excitations. The time-domain pulse excitation may facilitate collocated sensor acquisition during an off cycle or suffice to record non-collocated responses which may electronically be converted into multi-frequency (harmonics) measurements. In some cases, decreased signal-to-noise ratios (SNRs) associated with certain frequencies (e.g., higher harmonics) due to an inverse scaling with frequency may be addressed by the series of CW multi-frequency excitations where each frequency is excited individually to achieve higher (e.g., maximum) SNR. A fundamental frequency of the EM inspection tool 160 may be sufficiently low to penetrate a desired number of metallic casings 122 (e.g., 0.3 Hz or lower to penetrate 5, 6, or more metallic casings).

Pulsed eddy current (PEC) evaluation of multiple casings 122 may include using pulsed current source to excite eddy currents in the casings 122. For each excitation frequency, a primary EM field generated by a transmitter coil (e.g., solenoidal coil) may induce the eddy currents in the surrounding casings flowing azimuthally along a specific direction to generate a secondary EM field opposing the excitation field (the primary EM field). The secondary EM field may decay exponentially, therefore generating (e.g., inducing) currents in surrounding casings that are sensed by the receiver coil. In some cases, the respective strengths of the primary EM field and secondary EM field may decrease by $1/R^3$, where R is the distance or spacing from the transmitter coil.

Figure 4:
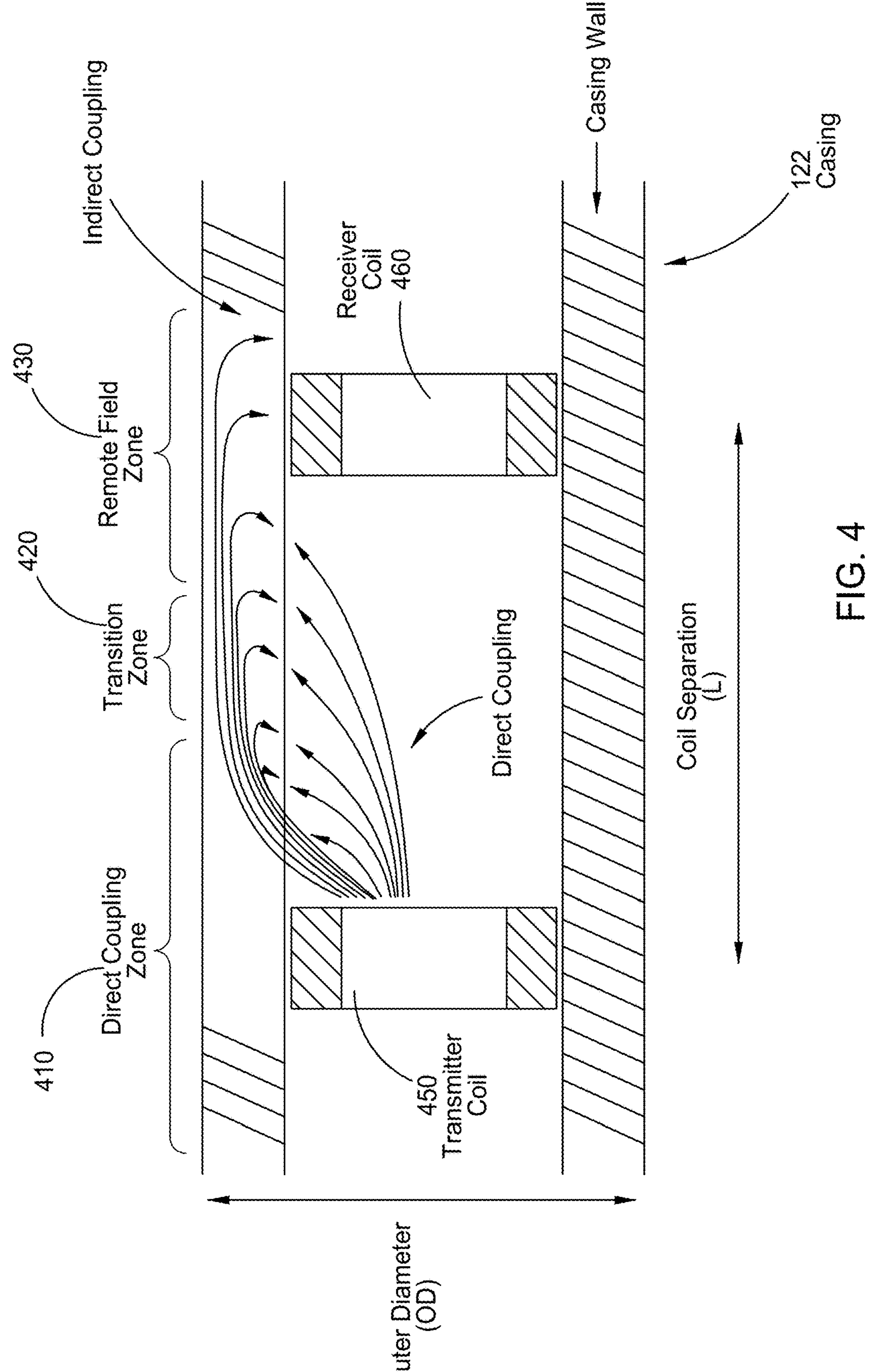
FIG. 4 depicts an example distribution of EM fields among different zones, according to various embodiments.

With the foregoing in mind, as shown in FIG. 4, the primary EM field and the secondary EM field may interact with each other in the coil region for each excitation frequency, resulting in a distribution of EM fields among a direct coupling zone 410, a transition zone 420, and a remote field zone 430.

In the direct coupling zone 410, the primary EM field (or direct coupling field) may be stronger than the secondary EM field, e.g., due to relatively small separation from the transmitter coil 450 compared to the secondary EM field. The secondary EM field, for example, may decay exponentially while inducing currents in the casings 122. In the transition zone 420, the primary EM field and the secondary EM field may have the same order of magnitude but opposite directions (due to Faraday's law and Lorentz's law). In the remote field zone 430, the secondary EM field may be stronger than the primary EM field due to the primary EM field decaying by $1/R^3$. Note, in certain embodiments, the remote field zone 430 occurs at spacings of 2 to 3 times the size (e.g., outer diameter) of the outer casing 122. For such large distance spacings, the ohmic losses incurred in induced current, along the casing length, may be less than the cubic reduction in the primary EM field.

Figure 5:
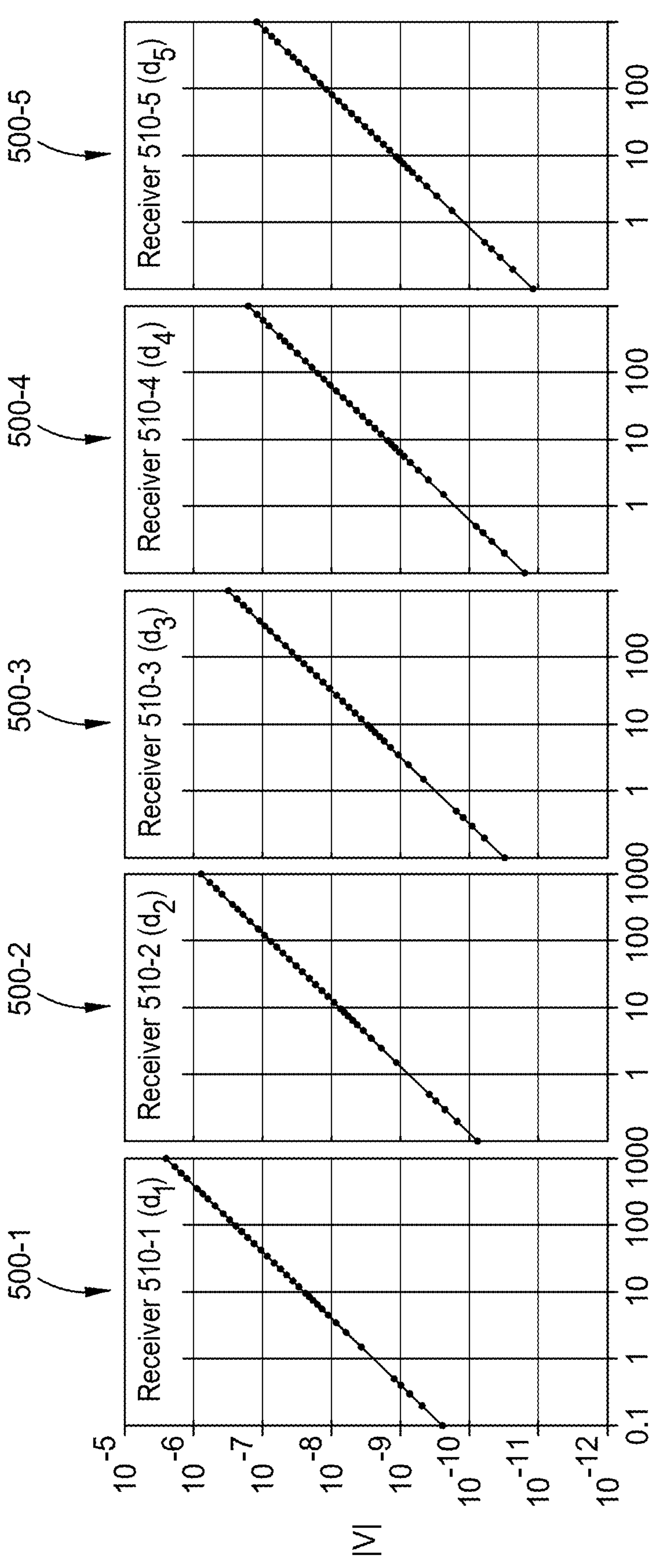
FIG. 5 depicts example frequency spectrums of measured voltages for a non-collocated receiver arrangement of an EM inspection tool, according to various embodiments.

In certain embodiments, the strength of the primary EM field (induced by the transmitter coil) may decrease by $1/R^3$ in free space (e.g., air) and link with the receiving coil 460 to induce a voltage in the coil so as to generate a time harmonic current (based on Lorentz law) that flows in a direction opposite to the source creating it (e.g., the magnetic field lines). By way of example, FIG. 5 depicts graphs 500-1 to 500-5 illustrating example frequency spectrums of measured voltages for a non-collocated receiver (sensor) arrangement of an EM inspection tool (e.g., EM inspection tool 160), according to various embodiments. In the depicted example, the EM inspection tool may include five non-collocated receivers 510-1 to 510-5, which may be similar to one or more of the non-collocated receivers (e.g., receivers 262, 264, 266, 268, and 269) illustrated in FIG. 2.

In FIG. 5, the receiver 510-1 may be located at distance (or spacing) $d_1$ from the transmitter (e.g., transmitter 260), the receiver 510-2 may be located at distance (or spacing) $d_2$ from the transmitter, the receiver 510-3 may be located at distance (or spacing) $d_3$ from the transmitter, the receiver 510-4 may be located at distance (or spacing) $d_4$ from the transmitter, and the receiver 510-5 may be located at distance (or spacing) $d_5$ from the transmitter, where $d_1<d_2<d_3<d_4<d_5$. As indicated in FIG. 5, there is a cubically decreasing scaling of voltage magnitudes (e.g., in free space) as the spacing from the transmitter increases.

Figure 6:
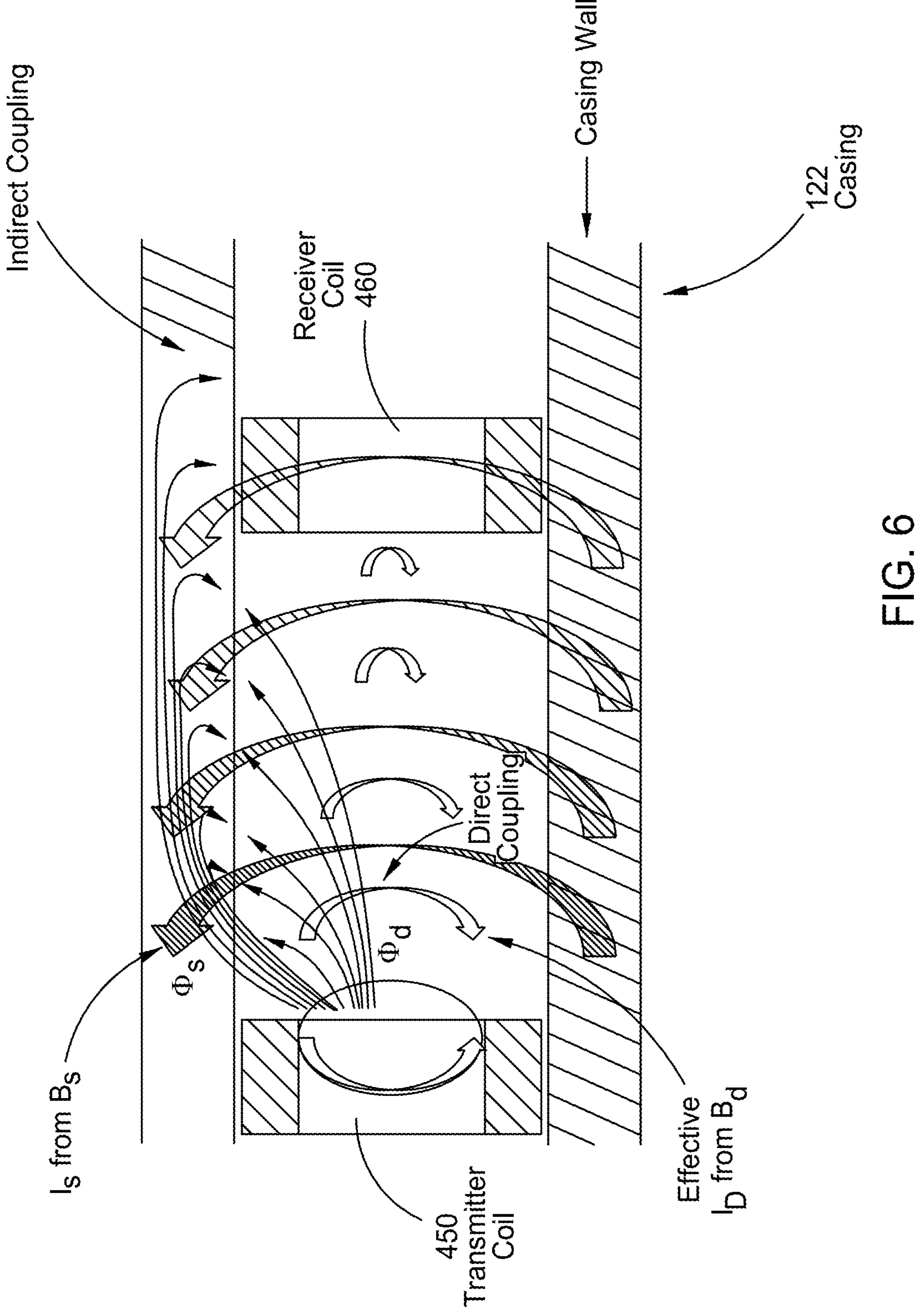
FIG. 6 depicts an example distribution of EM fields for coils within a casing, according to various embodiments.

In certain embodiments, when a pair of coils (e.g., transmitter coil 450 and receiver coil 460) is placed inside of a metallic casing (or tubular) 122, the impact on the EM field distribution may be different than when the pair of coils is placed in air. By way of example, FIG. 6 depicts an example distribution of EM fields for a pair of coils within a casing 122, according to various embodiments. In particular, FIG. 6 illustrates the interaction between primary ($B_d$) and secondary ($B_S$) (e.g., induced) EM fields, resulting in eddy currents inside casings ($I_s$) and effective direct current ($I_d$) at different spacings.

In FIG. 6, the EM fields may flow through the low magnetic reluctance path of the metallic casing 122, e.g., due to the metallic casing 122 having a higher magnetic permeability than air. For instance, the relative magnetic permeability, $\mu_r$, of the metallic casing 122 (relative to air) may range from 20 to 160. At the same time, the EM fields may face a barrier of entry into the casing 122 due to attenuation of the EM fields, which may be represented by $\exp(-th/\delta)$ where $\delta=1/\sqrt{\pi f \sigma \mu}$ is known as the skin depth of the surrounding medium. In some cases, the EM field lines may favor the metallic casing path if the casing to coil gap is small and the frequency of excitation is low enough, such that the skin depth attenuation provides a lower barrier than the direct coupling path in free space (air). Note that the primary EM field distribution may also be different in metallic casings 122 than in free space (air).

Figure 7:
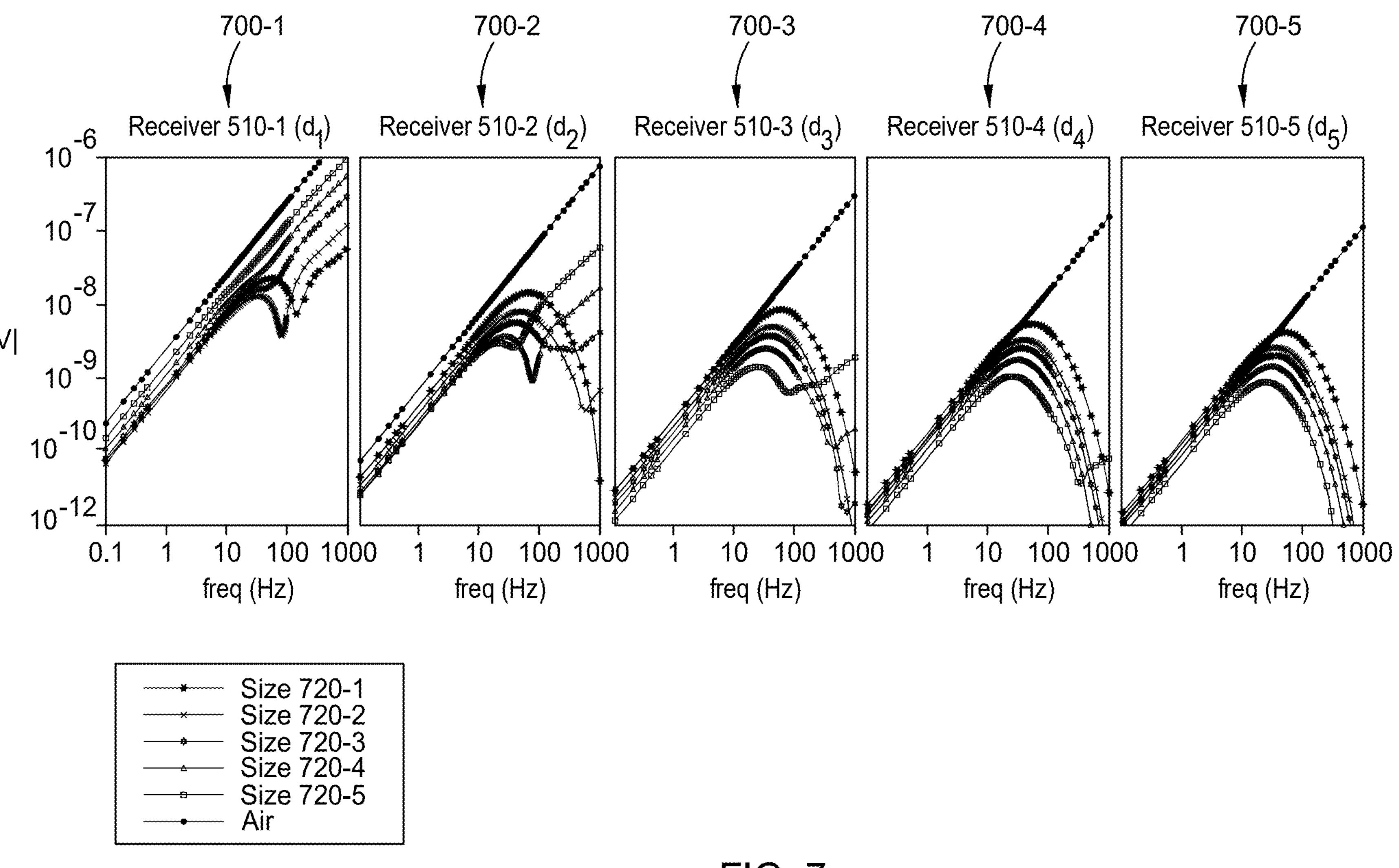
FIG. 7 depicts example frequency spectrums of measured voltages for a non-collocated receiver arrangement of an EM inspection tool, according to various embodiments.

FIG. 7 depicts graphs 700-1 to 700-5 illustrating example frequency spectrums of measured voltages for a non-collocated receiver (sensor) arrangement of an EM inspection tool (e.g., EM inspection tool 160), according to various embodiments. In particular, FIG. 7 shows the comparison of measured voltages for a non-collocated receiver arrangement in free space (air) with measured voltages for a non-collocated receiver arrangement in a metallic casing of different sizes (e.g., outer diameters) 720-1 to 720-5, where size 720-1<size 720-2<size 720-3<size 720-4<size 720-5.

As indicated in FIG. 7, in some cases, the inner surface of the metallic barrier may restrict the primary EM field because, at very high frequencies, the primary EM field lines may not be able to penetrate the metallic casings 122. Such restriction of the primary EM field lines may lead to direct field coupling, which may follow similar scaling but different field distribution due to the presence of the metallic barrier to the field lines. In other words, the EM field lines may have two coupling options with the receiver. The first coupling option may include direct coupling through the air and scaling as $1/R^3$ (e.g., for a coil separation of L, the magnetic field may be scaled by $1/L^3$) predominately for high frequency modes that may not be able to penetrate the metallic casings 122 due to the skin depth phenomenon. The second coupling option may include an indirect coupling path through the surrounding metallic casings 122. For example, depending on the frequency of excitation, the EM field lines may travel an indirect coupling path through the surrounding metallic casings 122 due to EM induction (e.g., Faraday's law). The time-varying harmonic EM field may penetrate the metallic casing 122 and induce current in the casing 122, generating secondary EM fields in a direction opposite to the direct coupling field inside the casing 122. The EM field penetrating the metallic casing 122 may undergo attenuation governed by skin depth, which is an exponential decay of magnetic fields given by $\exp(-th/\delta)$ where $\delta=1/\sqrt{\pi f \sigma \mu}$.

As noted, in certain embodiments, in the transition zone, the opposite polarity primary and secondary couplings generally have comparable magnitudes. For example, as a receiver location moves away from the transmitter coil, the primary EM field may reduce by $1/R^3$, and at a certain distance from the transmitter, the primary EM field may be approximately equal to the secondary EM field generated by induced eddy currents flowing circumferentially in the casing 122. In certain embodiments, the location at which the primary EM field is approximately equal to the secondary EM field may be indicated by a "null" in the frequency spectrum. The location of the "null" may be based on the frequency of excitation and size of the surrounding casings 122.

In general, as the size of a casing 122 gets smaller, the number of EM field lines that couple with the casing 122 may increase, allowing the EM field(s) at higher frequencies to have sufficient magnitude to penetrate the metallic casing 122. As a result of such phenomena, the region and strength of the primary EM field may be smaller and balanced at shorter spacings by the secondary EM field (e.g., due to the primary field's preference of taking the less magnetic reluctant path). The field modes above this null, for a particular spacing, may represent direct coupling or primary field modes and may be representative of the inner surface of the tubing scaling and intrinsic impedance of the system (scaling linearly with frequency, e.g., $\omega M'$, where M' is the mutual impedance of the coil pair in the presence of the casing). For larger size casings, lower frequency field lines may penetrate the metal, since the field strength of higher frequency modes may not be sufficient to overcome the skin-depth attenuation. In such cases, the axial extent and strength of primary field zone may be bigger, and the null may appear at a longer spacing and for lower frequencies.

Figure 8:
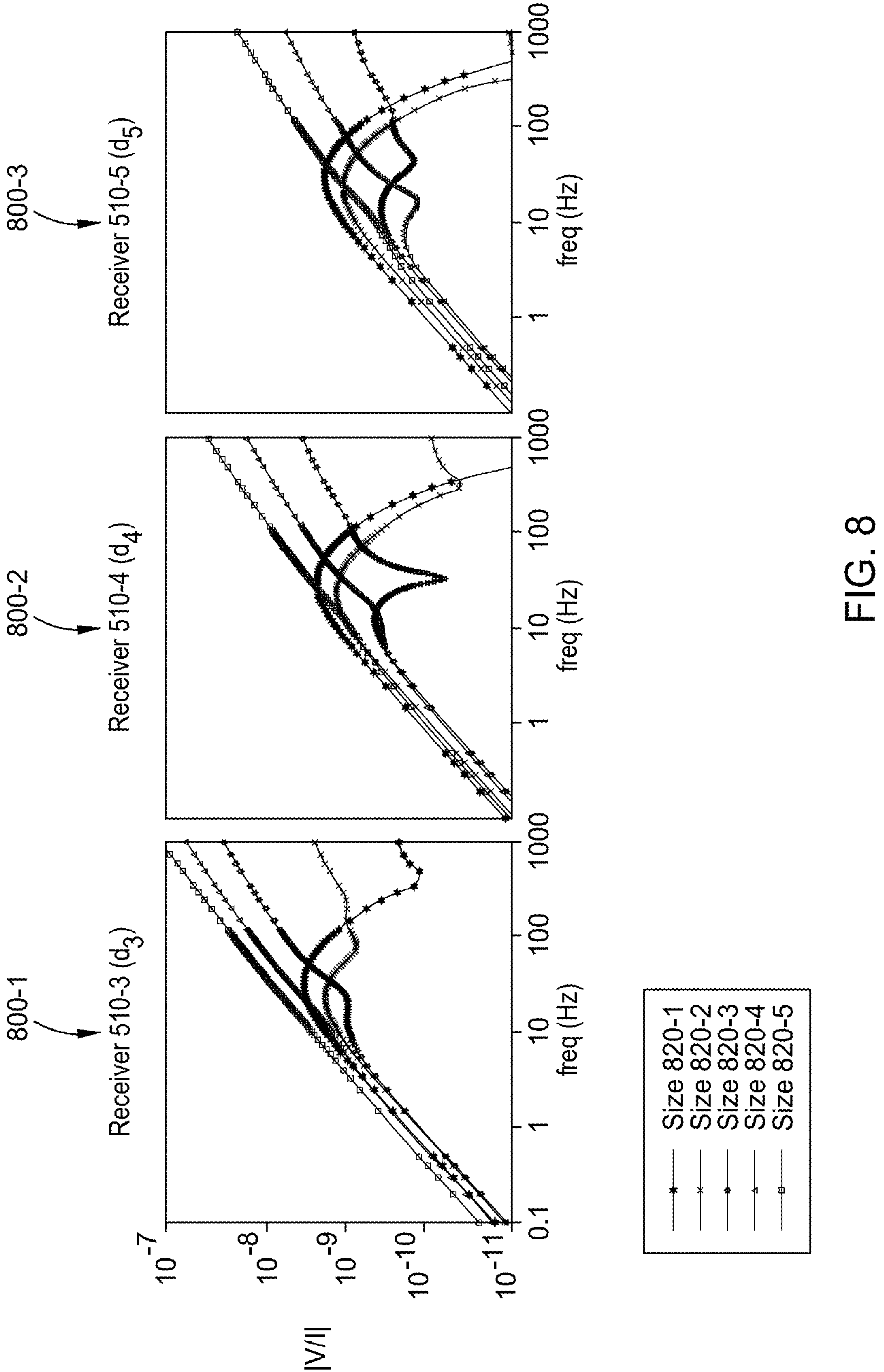
FIG. 8 depicts example frequency spectrums of measured impedances for a non-collocated receiver arrangement of an EM inspection tool, according to various embodiments.

By way of example, FIG. 8 depicts graphs 800-1 to 800-5 illustrating example frequency spectrums of measured impedances (e.g., Z=V/I) for a non-collocated receiver (sensor) arrangement of an EM inspection tool (e.g., EM inspection tool 160), according to various embodiments. In particular, FIG. 8 shows an example of null frequencies appearing in the frequency spectrums of receivers 510-3 to 510-5 for different casing sizes (e.g., outer diameters) 820-1 to 820-5, where size 820-1<size 820-2<size 820-3<size 820-4<size 820-5. In certain embodiments, the size 820-1 may be at least 3.5 inches. In general, the nulls of smaller pipes may appear at shorter spacings and at higher frequencies, whereas the nulls of larger pipes may appear at longer spacings and at lower frequencies (e.g., since higher frequency modes may fail to contribute to secondary EM fields).

In certain embodiments, the EM field distribution for multiple casings 122 may be different than the EM field distribution for a single casing 122. For example, the changing EM field generated by the inner casing's eddy current may induce current in the outer casing of opposite direction, which, in effect, reduces the secondary EM field inside the tubular region occupied by the coils. In some cases, the presence of one or more outer casings 122 may increase the skin depth effect. That is, compared to single casing scenarios, in multi-casing scenarios, the axial extent and strength of the direct coupling zone (primary EM field zone) may be larger, leading to the occurrence of nulls at longer spacings and at lower frequencies.

Figure 9:
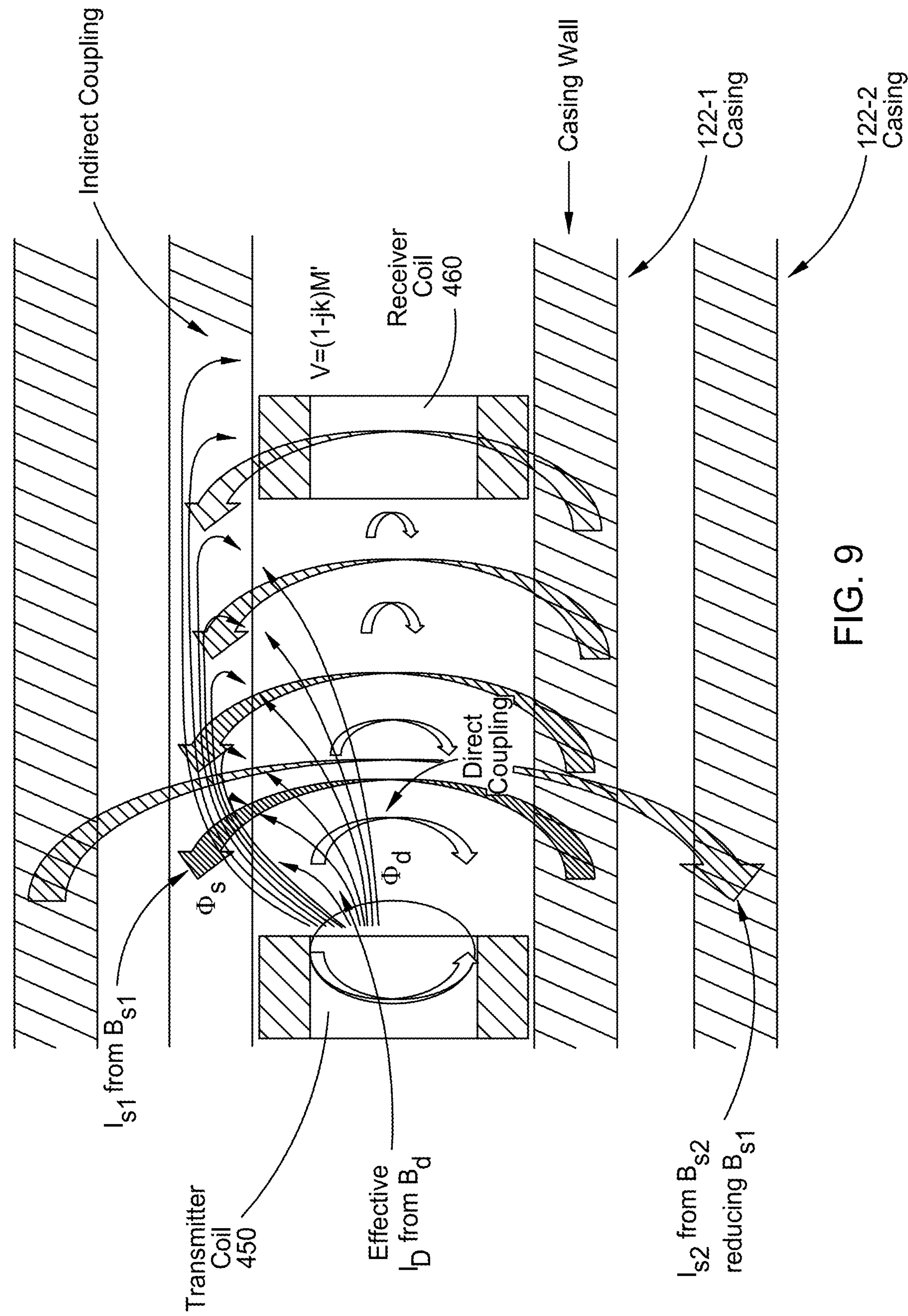
FIG. 9 depicts an example distribution of EM fields for coils within multiple casings, according to various embodiments.

By way of example, FIG. 9 depicts an example distribution of EM fields for a pair of coils within multiple casings 122-1 to 122-2, according to various embodiments. In particular, FIG. 9 depicts an example of the interaction between primary ($B_d$) and secondary ($B_{s1}$ and $B_{s2}$) EM fields which results in eddy currents ($I_{s1}$) inside the casing 122-1, oppositely directed currents ($I_{s2}$) inside the casing 122-2 and effective direct current ($I_D$) in coils at different spacings. $I_{s2}$ may reduce the effective secondary EM field in the coil region and shift the null to lower frequencies.

Figure 10:
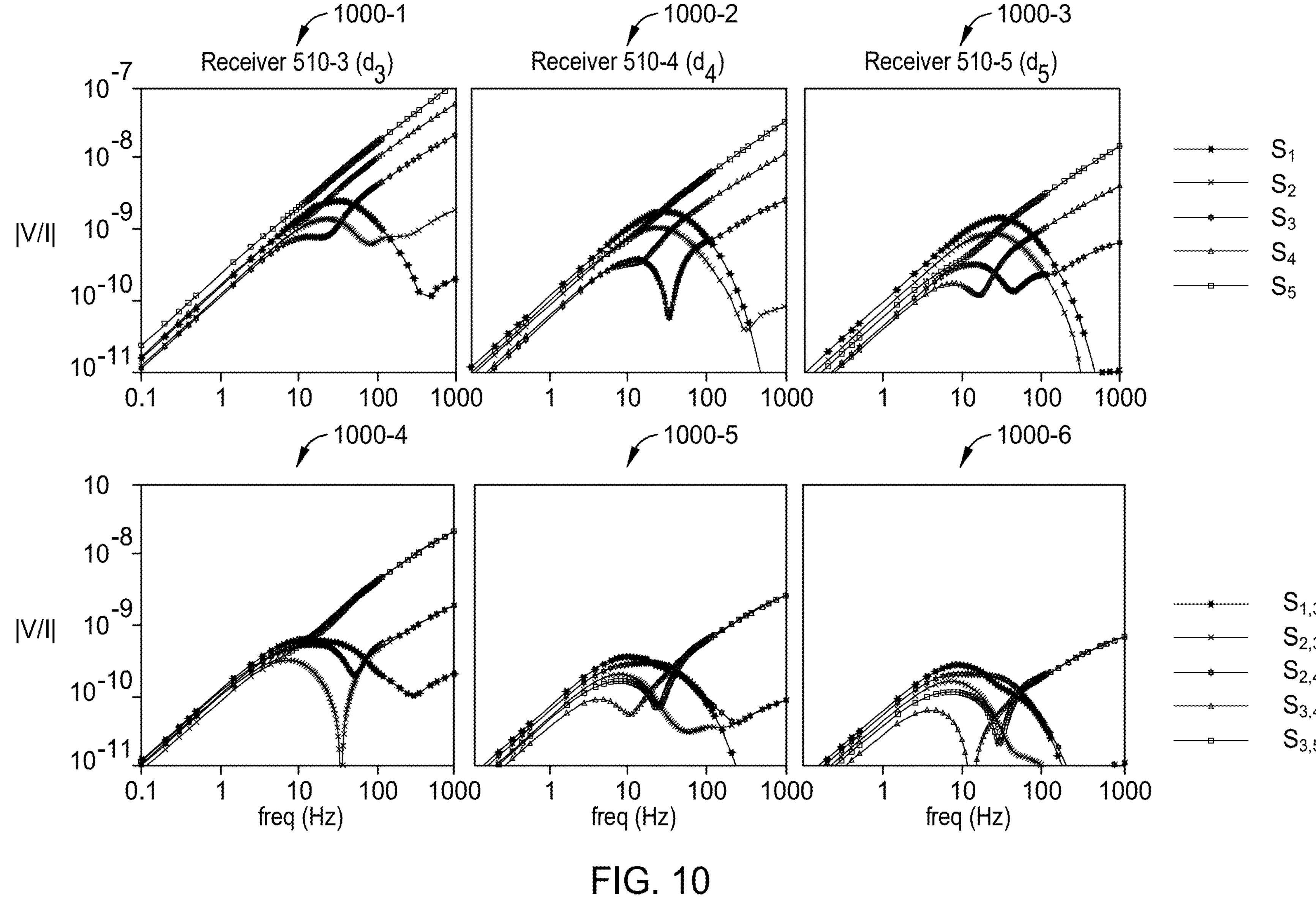
FIG. 10 depicts example frequency spectrums of measured impedances for a non-collocated receiver arrangement of an EM inspection tool, according to various embodiments.

FIG. 10 depicts graphs 1000-1 to 1000-6 illustrating frequency spectrums of measured impedances for a non-collocated receiver (sensor) arrangement of an EM inspection tool (e.g., EM inspection tool 160), according to various embodiments. In particular, FIG. 10 shows the effect on the occurrence of the frequency spectrum "null," which indicates the cancellation of the primary EM field and secondary EM field couplings inside the region occupied by the sensing coils. In FIG. 10, graphs 1000-1 to 1000-3 illustrate frequency domain responses at receivers 510-3 to 510-5, respectively, for single casings of various sizes $S_1$, $S_2$, $S_3$, $S_4$, and $S_5$, where $S_1<S_2<S_3<S_4<S_5$. Graphs 1000-4 to 1000-6 illustrate corresponding frequency domain responses at receivers 510-3 to 510-5, respectively, for various combinations of two casing sizes $S_{1,3}$, $S_{2,3}$, $S_{2,4}$, $S_{3,4}$, and $S_{3,5}$. For example, $S_{1,3}$ is a combination of an inner casing of size $S_1$ and outer casing of size $S_3$, $S_{2,3}$ is a combination of an inner casing of size $S_2$ and outer casing of size $S_3$, $S_{2,4}$ is a combination of an inner casing of size $S_2$ and outer casing of size $S_4$, $S_{3,4}$ is a combination of an inner casing of size $S_3$ and outer casing of size $S_4$, and $S_{3,5}$ is a combination of an inner casing of size $S_3$ and outer casing of size $S_5$.

As shown in FIG. 10, the presence of the outer casing 122 may reduce the magnitude of the secondary EM field inside the tubular region within the coils, leading to increased axial extent of the primary EM field zone and occurrence of a null at lower frequencies. As an example, for receiver 510-3, as indicated in graph 1000-1, the null for a single casing of size $S_1$ occurs at approximately 400 hertz (Hz). However, as indicated in graph 1000-4, the presence of an additional casing of size $S_3$ (e.g., a casing combination of $S_{1,3}$) may move the null location to a lower frequency (e.g., approximately 250 Hz). In this example, the indirect coupling for modes below 400 Hz may become weaker in the presence of the additional casing, thereby allowing the direct coupling to dominate above 250 Hz. Thus, in general, for at least combinations of two casings, the null frequencies may appear at longer spacings and lower frequencies for larger casing sizes than for smaller casing sizes and for single casings.

Example Multi-Casing Evaluation Using Multi-Frequency, Non-Collocated, Induction Measurements As noted, certain embodiments herein provide techniques for determining casing count (e.g., a number of casings) and casing sizes in a multi-casing well using multi-frequency, non-collocated, induction measurements obtained via an EM inspection tool (e.g., EM inspection tool 160). Additionally or alternatively, certain embodiments herein provide techniques for determining optimal sensor placement and frequency selection for an EM inspection tool.

Figure 11:
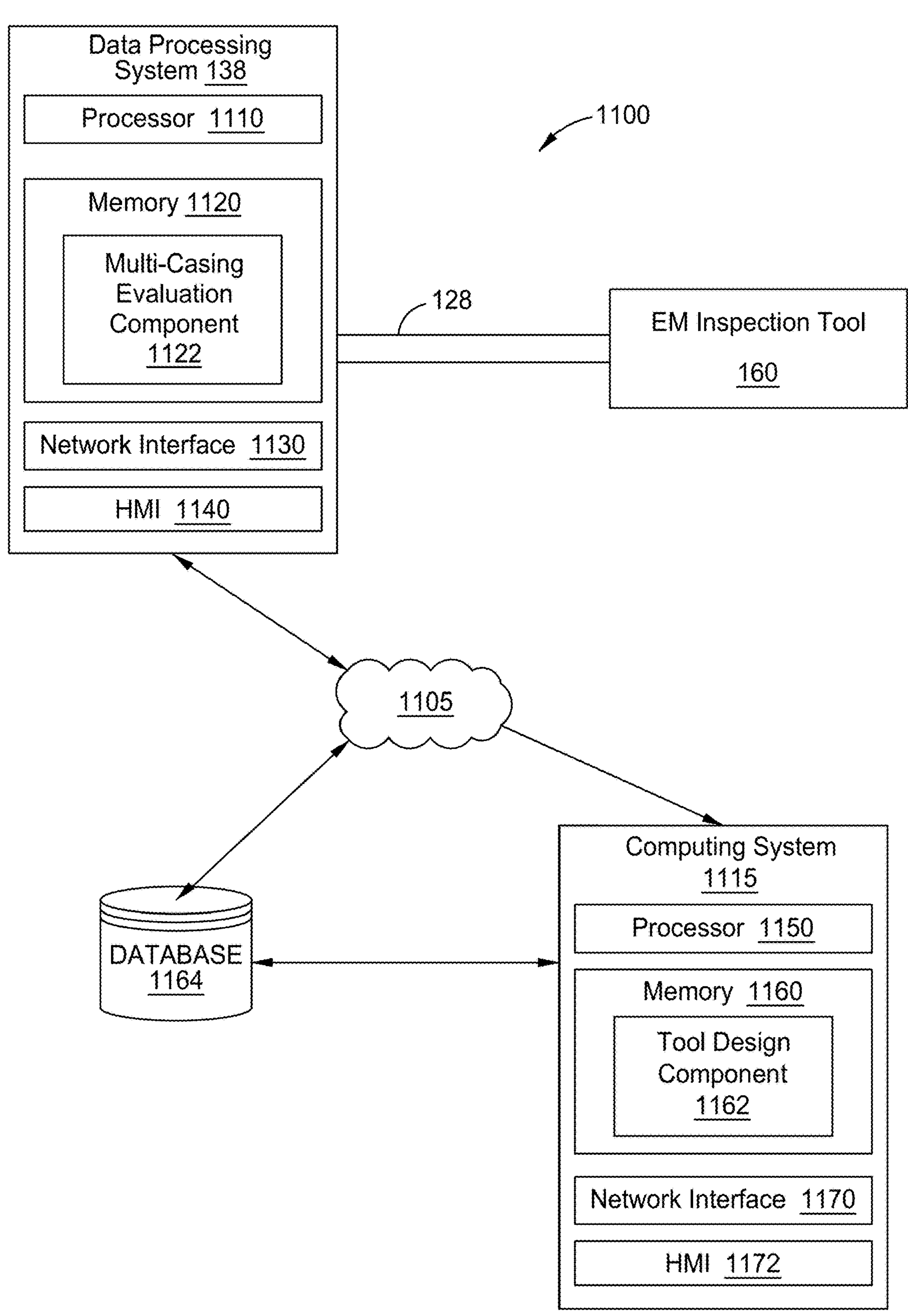
FIG. 11 depicts an example of a multi-casing evaluation system, according to various embodiments.

FIG. 11 is a block diagram of an example system 1100 for performing a multi-casing evaluation using multi-frequency, non-collocated induction measurements obtain via an EM inspection tool, according to various embodiments. In certain embodiments, the system 1100 may be implemented as part of the system 100 depicted in FIG. 1.

As shown, the system 1100 includes, without limitation, the data processing system 138, computing system 1115, database 1164, and EM inspection tool 160. The data processing system 138, computing system 1115, and database (s) 1164 may be interconnected via a network 1105. The network 1105 is representative of a variety of networks, such as a personal area network (PAN) (e.g., a Bluetooth network), a local area network (LAN) (e.g., 802.11 or WiFi network), and a wide area network (WAN) (e.g., cellular network), as illustrative examples.

The data processing system 138 and computing system 1115 are generally representative of a variety of computing systems, such as laptops, servers, desktops, and mainframes, as illustrative examples. In certain embodiments, one or more of the data processing system 138 and computing system 1115 (including one or more components thereof) are located in (or otherwise accessible via) a cloud computing environment. The data processing system 138 and computing system 1115 may be implemented using hardware, software, or a combination of hardware and software.

The database 1164 is generally representative of one or more storage systems configured to store information associated with multi-casing evaluation. For example, the database 1164 may store multi-frequency, non-collocated, induction measurements obtained via the EM inspection tool 160. The database 1164 may be implemented using hardware, software, or a combination of hardware and software. In certain embodiments, the database 1164 is located in (or otherwise accessible via) a cloud computing environment.

As noted, the EM inspection tool 160 may be controlled to measure and generate data including multi-frequency, non-collocated (e.g., multiple spacing), induction measurements for a well having nested casings. The EM inspection tool 160 may provide the data to the data processing system 138 via the cable 128.

The data processing system 138 is generally configured to analyze the data obtained via the EM inspection tool 160 to determine various parameters associated with the nested casings, including, for example, a number of casings 122 and a size of each casing 122. The data processing system 138 may use various techniques, such as inversion, model searching, and simulated annealing, as illustrative, non-limiting examples, to analyze the data. Note, in certain embodiments, the data processing system 138 may retrieve and analyze data including multi-frequency, non-collocated, induction measurements from the database 1164. That is, in certain embodiments, information obtained using the EM inspection tool 160 may be stored in the database 1164 for later analysis by the data processing system 138.

As shown, the data processing system 138 includes, without limitation, a processor 1110, a memory 1120, a network interface 1130, and a human machine interface (HMI) 1140. The processor 1110 represents any number of processing elements, which can include any number of processing cores. The memory 1120 can include volatile memory, non-volatile memory, and combinations thereof. The memory 1120 generally includes program code (e.g., multi-casing evaluation component 1122) for performing various techniques described herein for evaluating multi-casing wells using multi-frequency, non-collocated, induction measurements obtained via an EM inspection tool 160. The program code is generally described as various functional "components" or "modules" within the memory 1120, although alternate implementations may have different functions or combinations of functions.

The network interface 1130 may include circuitry for communicating over the network 1105. For example, the network interface 1130 may include interfaces for PAN, LAN, and/or WAN, as illustrative examples. The HMI 1140 may include one or more input and/or output devices for enabling communication between the processor 1110, the memory 1120, the network interface 1130, and one or more users. In certain embodiments, the HMI 1140 includes one or more input devices, one or more output devices, or a combination thereof. For example, the HMI 1140 may include a display and/or a keyboard, a mouse, a touch pad, or other input devices suitable for receiving inputs from a user. In certain embodiments, the HMI 1140 includes a touch-screen display (e.g., touch screen liquid crystal display (LCD)), which may enable users to interact with a user interface of the data processing system 138.

In certain embodiments, the computing system 1115 is configured to evaluate and determine sensor (e.g., receiver) placement and frequency selection for an EM inspection tool. The computing system 1115 may determine the sensor placement and frequency selection based on analyzing data including one or more magnetic field distributions for multiple casing configurations for arbitrary well completions. In certain embodiments, the computing system 1115 may obtain at least some of the data from one or more databases (e.g., database 1164). The data may include simulated data, data obtained from field measurements (e.g., via EM inspection tool 160), or a combination thereof.

As shown, the computing system 1115 includes, without limitation, a processor 1150, a memory 1160, a network interface 1170, and a HMI 1172. The processor 1150 represents any number of processing elements, which can include any number of processing cores. The memory 1160 can include volatile memory, non-volatile memory, and combinations thereof. The memory 1160 includes program code (e.g., tool design component 1162) for performing various techniques described herein for determining sensor placement and frequency selection for an EM inspection tool. The program code is generally described as various functional "components" or "modules" within the memory 1160, although alternate implementations may have different functions or combinations of functions.

The network interface 1170 may include circuitry for communicating over the network 1105. For example, the network interface 1170 may include interfaces for PAN, LAN, and/or WAN, as illustrative examples. The HMI 1172 may include one or more input and/or output devices for enabling communication between the processor 1150, the memory 1160, the network interface 1170, and one or more users. In certain embodiments, the HMI 1172 includes one or more input devices, one or more output devices, or a combination thereof. For example, the HMI 1172 may include a display and/or a keyboard, a mouse, a touch pad, or other input devices suitable for receiving inputs from a user. In certain embodiments, the HMI 1172 includes a touch-screen display (e.g., touch-screen LCD), which may enable users to interact with a user interface of the computing system 1115.

In certain embodiments, the multi-casing evaluation component 1122 evaluates multi-frequency, non-collocated, induction measurements obtained via an EM inspection tool in order to differentiate casings within a well from one another. For example, the multi-casing evaluation component 1122 can differentiate single pipes from one another, based on the slope of the high frequency, direct coupling responses (e.g., beyond the null frequencies) within the induction measurements. Additionally, the multi-casing evaluation component 1122 can differentiate one or more outer pipes based on the one or more null frequencies within the induction measurements.

Figure 12:
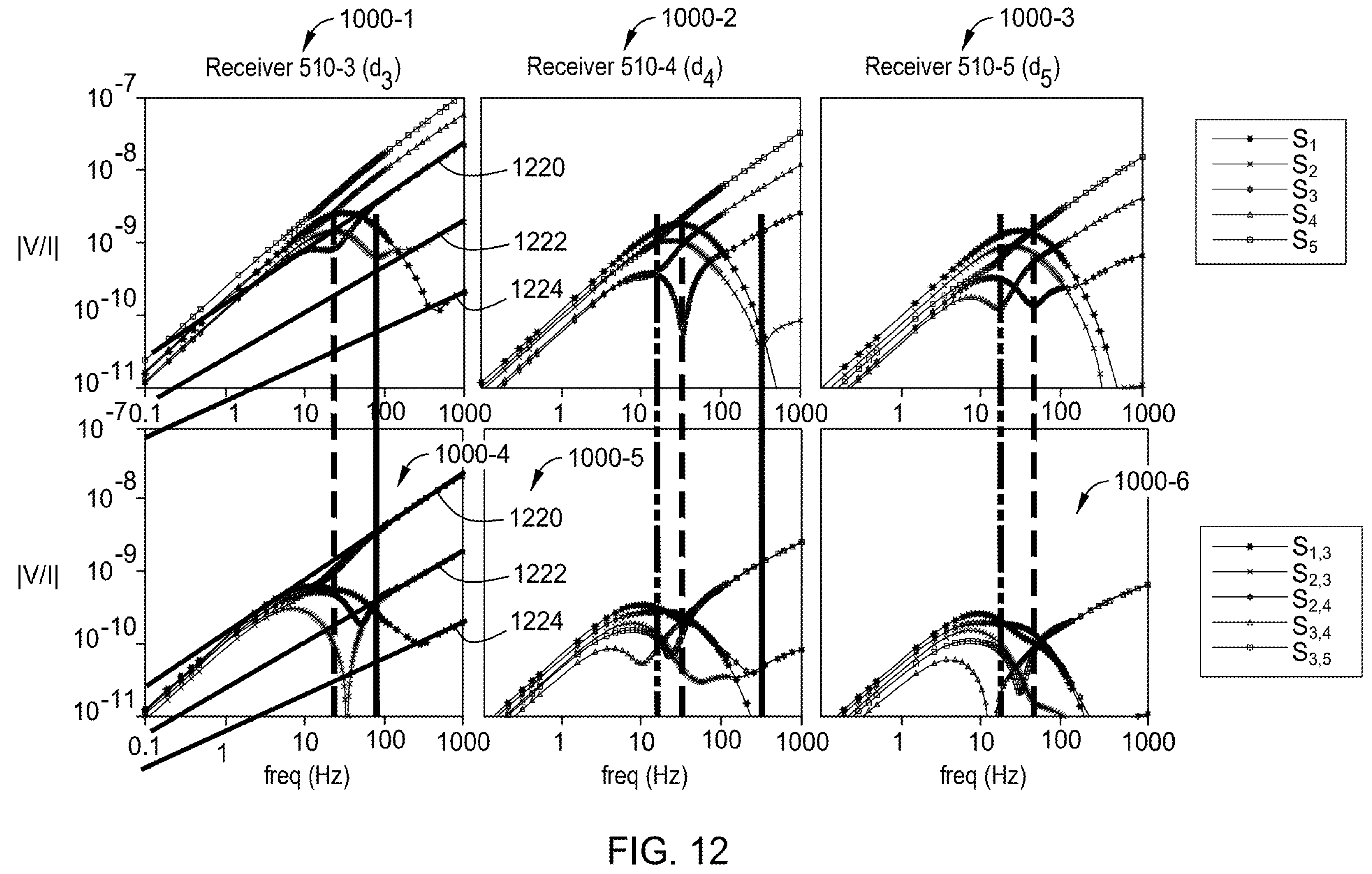
FIG. 12 depicts an example scenario for differentiating casings of a multi-casing well from the frequency spectrums illustrated in FIG. 10, according to various embodiments.

Consider FIG. 12, which illustrates an example scenario for differentiating "first" casings (e.g., innermost pipes) of a multi-casing well from the slope of high frequency responses in the set of induction measurements illustrated in FIG. 10, according to various embodiments. As indicated in FIG. 12, at high frequencies (e.g., above null frequencies), the EM fields may not penetrate the inner surface of the metallic casing 122 and the received responses (at high frequencies) may be indicative of the casing's diameter (which remains fixed) for a certain completion and intrinsic impedance of the casing 122. At such high frequencies, the received responses may scale linearly with frequency times the system mutual inductance, M'. As indicated in FIG. 12, each casing's high frequency response has a different slope, which remains the same even if there are outer casings present, e.g., since high frequency modes may not penetrate beyond the inner surface of the innermost pipe boundary. By way of example, as indicated in graph 1000-1 of FIG. 12, for receiver 510-3, slope 1220 may be indicative of the casing with size $S_3$, slope 1222 may be indicative of the casing with size $S_2$, and slope 1224 may be indicative of the casing with size $S_1$. As indicated in graph 1000-4 for receiver 510-3, with the presence of an additional "second" (outer) casing, the slopes 1220, 1222, and 1224 remain the same and are indicative of the respective "first" (inner) casing sizes $S_3$, $S_2$, and $S_1$.

FIG. 12 also indicates a shifting of nulled frequencies due to induced current in the "second" (outer) casing from the "first" (inner) casing's secondary EM field, which flows in opposite direction to the current from the "first" casing. Such shifting of the nulled frequencies reduces the magnitude of the secondary EM field inside the tubular region with the coils, leading to increased axial extent of the primary EM field zone and occurrence of the null at lower frequencies. In some cases, reducing the size of the "second" casing 122 may increase the amount of the "first" casing's secondary EM field that gets canceled, causing the null to occur at lower frequencies.

By way of example, as indicated in graph 1000-1 of FIG. 12, for receiver 510-3, the null for the single casing of Size $S_2$ occurs at approximately 85 Hz. However, as indicated in graph 1000-4 of FIG. 12, the presence of an additional casing of Size $S_4$ (e.g., casing combination of $S_{2,4}$) shifts the null to a lower frequency at approximately 70 Hz. Similarly, for receiver 510-3, as indicated in graph 1000-4 of FIG. 12, the presence of an additional casing of Size $S_3$ (e.g., casing combination of $S_{2,3}$) shifts the null to a lower frequency at approximately 35 Hz (e.g., due to higher coupling).

In another example, with respect to the receiver 510-4, as indicated in graph 1000-2 of FIG. 12, the null for the single casing of Size $S_3$ occurs at approximately 35 Hz. However, for receiver 510-4, as indicated in graph 1000-5 of FIG. 12, the presence of an additional casing of Size $S_5$ (e.g., casing combination of $S_{3,5}$) shifts the null to a lower frequency at approximately 25 Hz. Similarly, for receiver 510-4, as indicated in graph 1000-5 of FIG. 12, the presence of an additional casing of Size $S_4$ (e.g., casing combination of $S_{3,4}$) shifts the null to a lower frequency at approximately 10 Hz.

Figure 13:
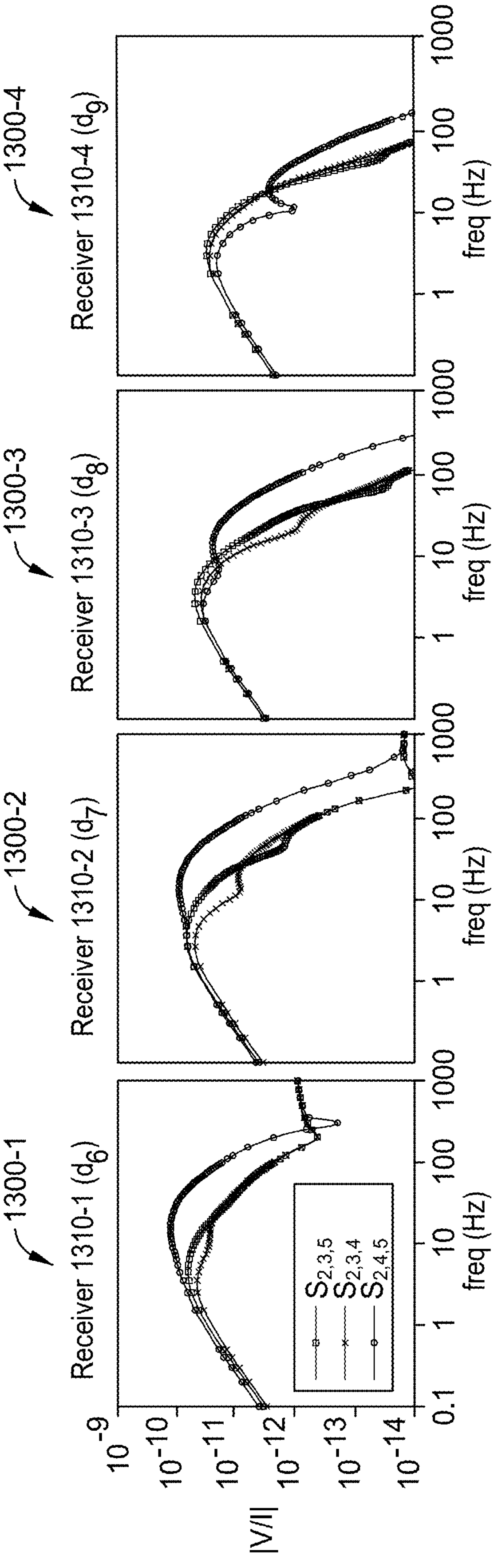
FIG. 13 depicts another example scenario for differentiating casings of a multi-casing well, according to various embodiments.

FIG. 13 depicts graphs 1300-1 to 1300-4 illustrating frequency spectrums of measured impedances for a non-collocated receiver (sensor) arrangement of an EM inspection tool (e.g., EM inspection tool 160) for different three-casing combinations, according to various embodiments.

For example, $S_{2,3,5}$ is a combination of a "first" inner casing of size $S_2$, a "second" outer casing of size $S_3$, and a "third" outer casing of size $S_5$; $S_{2,3,4}$ is a combination of a "first" inner casing of size $S_2$, a "second" outer casing of size $S_3$, and a "third" outer casing of size $S_4$; and $S_{2,4,5}$ is a combination of a "first" inner casing of size $S_2$, a "second" outer casing of size $S_4$, and a "third" outer casing of size $S_5$, where $S_1<S_2<S_3<S_4<S_5$.

In FIG. 13, the receivers 1310-1 to 1310-4 may be similar to one or more of the non-collocated receivers (e.g., receivers 262, 264, 266, 268, and 269) illustrated in FIG. 2. The receiver 1310-1 may be located at distance (or spacing) de from the transmitter, the receiver 1310-2 may be located at distance (or spacing) $d_7$ from the transmitter, the receiver 1310-3 may be located at distance (or spacing) da from the transmitter, and the receiver 1310-4 may be located at distance (or spacing) do from the transmitter, where $d_6<d_7<d_8<d_9$. In certain embodiments, relative to the receivers 510-1 to 510-4 described with respect to FIG. 5, each of the receivers 1310-1 to 1310-4 may be located at a further distance (or spacing) from the transmitter (e.g., $d_5$ for receiver 510-5<$d_6$ for receiver 1310-1).

FIG. 13 illustrates a scenario for differentiating "third" casings (e.g., an outer casing to two inner casings) when the inner casings have been differentiated from induction measurements of one or more shorter receivers. As shown, the presence of the "third" casing 122 may shift the null to lower frequencies. In particular, the smaller the third casing 122, the larger the shift to lower frequencies. As indicated in graph 1300-2, for casing combination of $S_{2,3,5}$, the third casing's null frequency band (for casing of size $S_5$) becomes prominent on receiver 1310-2 at approximately 35 Hz; whereas, for casing combination of $S_{2,3,4}$, the third casing's null frequency band (for casing of size $S_4$) is shifted to approximately 10 Hz with a separation of frequency spectrum from 2 Hz to 80 Hz.

As also indicated in FIG. 13, the size of the "second" casing 122 may impact the frequency responses on each of the receivers 1310-1 to 1310-4. Note, however, that the size of the "second" casing 122 may be determined based on the frequency responses of receivers at shorter spacings (e.g., receiver 510-3).

Figure 14:
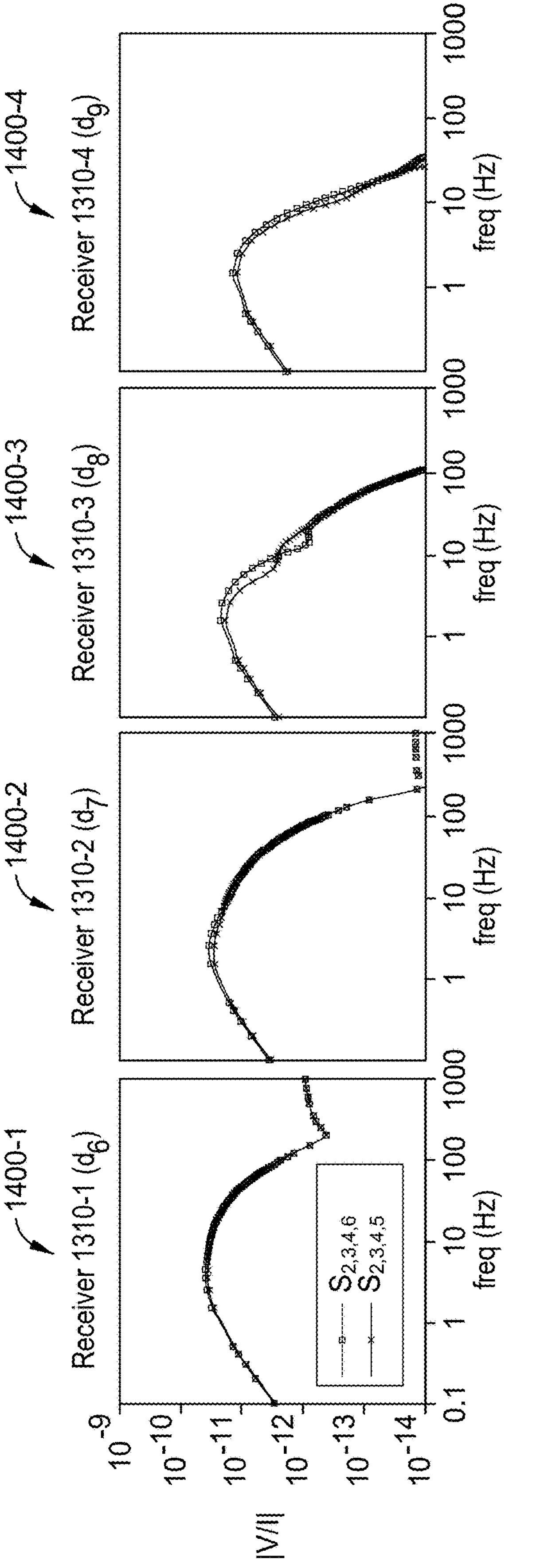
FIG. 14 depicts another example scenario for differentiating casings of a multi-casing well, according to various embodiments.

FIG. 14 depicts graphs 1400-1 to 1400-4 illustrating frequency spectrums of measured impedances for a non-collocated receiver (sensor) arrangement of an EM inspection tool (e.g., EM inspection tool 160) for different four-casing combinations, according to various embodiments. For example, $S_{2,3,4,6}$ is a combination of a "first" inner casing of size $S_2$, a "second" outer casing of size $S_3$, a "third" outer casing of size $S_4$, and a "fourth" outer casing of size $S_6$, and $S_{2,3,4,5}$ is a combination of a "first" inner casing of size $S_2$, a "second" outer casing of size $S_3$, a "third" outer casing of size $S_4$, and a "fourth" outer casing of size $S_5$, where $S_1<S_2<S_3<S_4<S_5<S_6$.

FIG. 14 illustrates a scenario for differentiating a "fourth" casing 122 (e.g., an outer casing to three inner casings) when the inner casings 122 have been differentiated from induction measurements of one or more receivers, e.g., using one or more techniques described herein. As shown, in differentiating the fourth casing 122, smaller sizes of the fourth casing 122 may shift the frequency null to lower frequencies than for larger sizes of the fourth casing 122, e.g., due to the secondary EM fields from smaller casings 122 being stronger for the same frequencies than secondary EM fields from larger casings 122. This phenomenon makes the secondary coil couplings closer to the null frequencies of three casings weaker than direct coupling and shifts the null to lower frequencies. By way of example, graph 1400-3 indicates the differentiation of the fourth casing of size $S_5$ from the fourth casing of size $S_6$ based on the null frequency locations in the frequency responses for receiver 1310-3. In particular, with a fourth casing of size $S_5$, the null is shifted to approximately 7 Hz, whereas, with a fourth casing of size $S_6$, the null is shifted to approximately 12 Hz.

Accordingly, using the techniques described herein, the "first" inner casing 122 can be determined based on the slope of the high frequency responses at shorter spacings (e.g., spacings where the direct coupling dominates as a result of modes reflected from the inner surface of the casing 122). For example, the slope may be proportional to the casing size. Note, the spacings used for determining the size of the "first" casing 122 may be shorter for smaller casing sizes than for larger casing sizes.

Additionally, using the techniques described herein, the "second" outer casing 122 can be detected based on the null locations in the frequency spectrums of one or more of the receivers of the EM inspection tool 160. For example, in certain embodiments, the same frequency responses that depict the null for the single casing scenario may depict the null at a lower frequency in the presence of the "second" casing. In some cases, a smaller "second" casing may be detected from a larger "second" casing based on the larger shift of the frequency null to low frequencies than from the larger "second" casing.

Additionally, using the techniques described herein, the "third" outer casing 122, "fourth" outer casing 122, "fifth" outer casing 122, "sixth" outer casing 122, "seventh" outer casing 122, and so on, can be detected based on the null locations in the frequency spectrums of one or more of the receivers of the EM inspection tool 160. In general, longer spacings may indicate shifts in the null to lower frequency inversely proportional to the respective casing's outer diameter.

Figure 15:
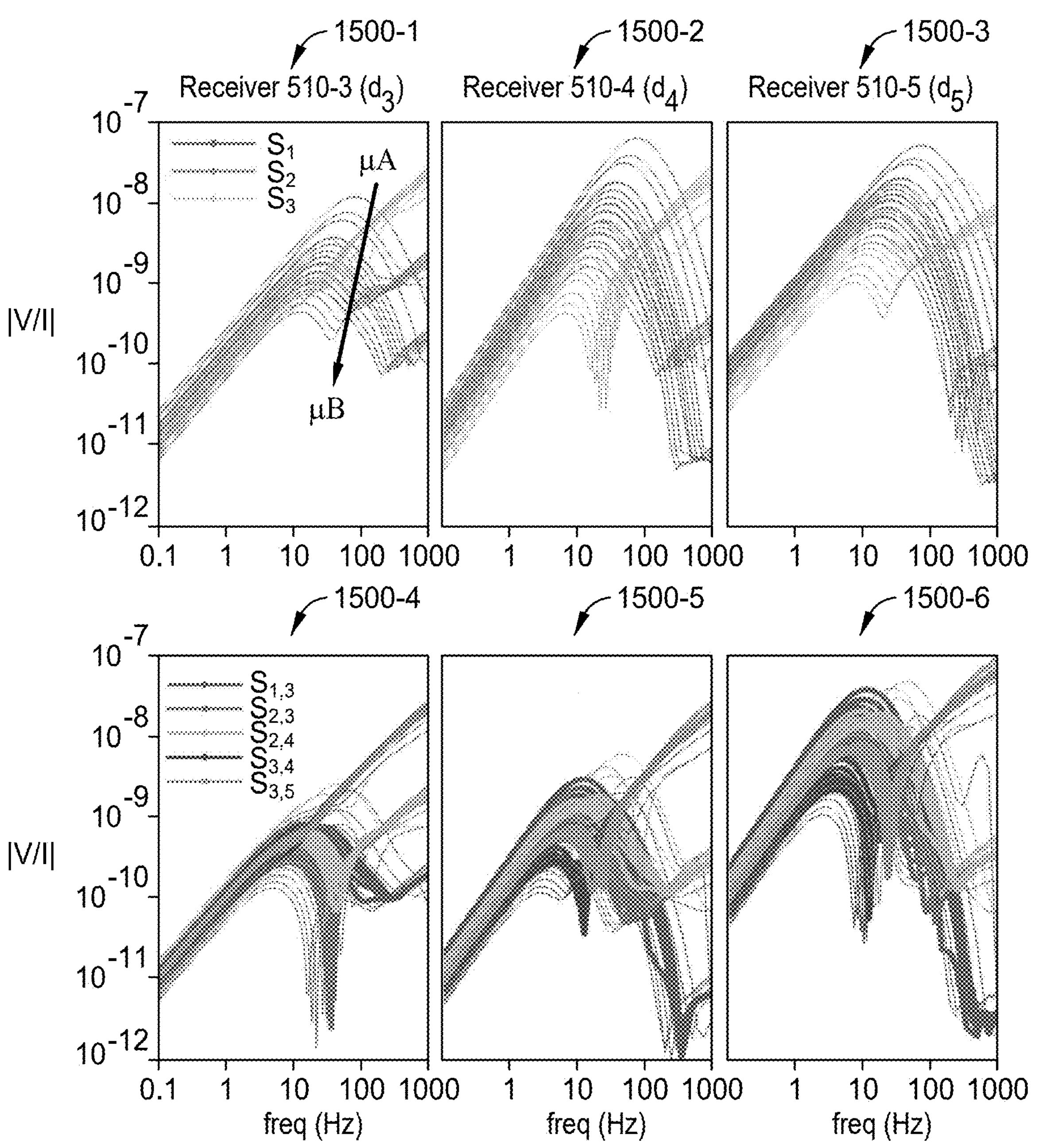
FIG. 15 depicts example frequency spectrums of measured impedances for a non-collocated receiver arrangement of an EM inspection tool for different casing properties, according to various embodiments.

In certain embodiments, the techniques described herein for determining the respective size of each casing in a multi-casing well can be used for casings 122 with different permeabilities. By way of example, FIG. 15 depicts graphs 1500-1 to 1500-6 illustrating respective frequency responses of receivers 510-3 to 510-5 to variation in casing relative magnetic permeability from a first magnetic permeability value ($\mu_A$) to a second magnetic permeability value ($u_B$), according to various embodiments. Graphs 1500-1 to 1500-3 depict respective frequency responses of the receivers 510-3 to 510-5 for single casings of sizes $S_1$, $S_2$, and $S_3$, and graphs 1500-4 to 1500-6 depict respective frequency responses of the receivers 510-3 to 510-5 for two-casings combinations for casing combinations of $S_{1,3}$, $S_{2,3}$, $S_{2,4}$, $S_{3,4}$, and $S_{3,5}$. As shown in graphs 1500-1 to 1500-3 in FIG. 15, the high-frequency slope-based determination of the "first" casing 122 can be performed for different combinations of casing permeability. Additionally, as shown in graphs 1500-4 to 1500-6 in FIG. 15, the "second" casing variation may have minimal impact in changing the location of the null. In some cases, there may be a shift to lower frequencies for certain values of the relative permeability for the "first" casing (e.g., relative magnetic permeability values greater than 100).

Figure 16:
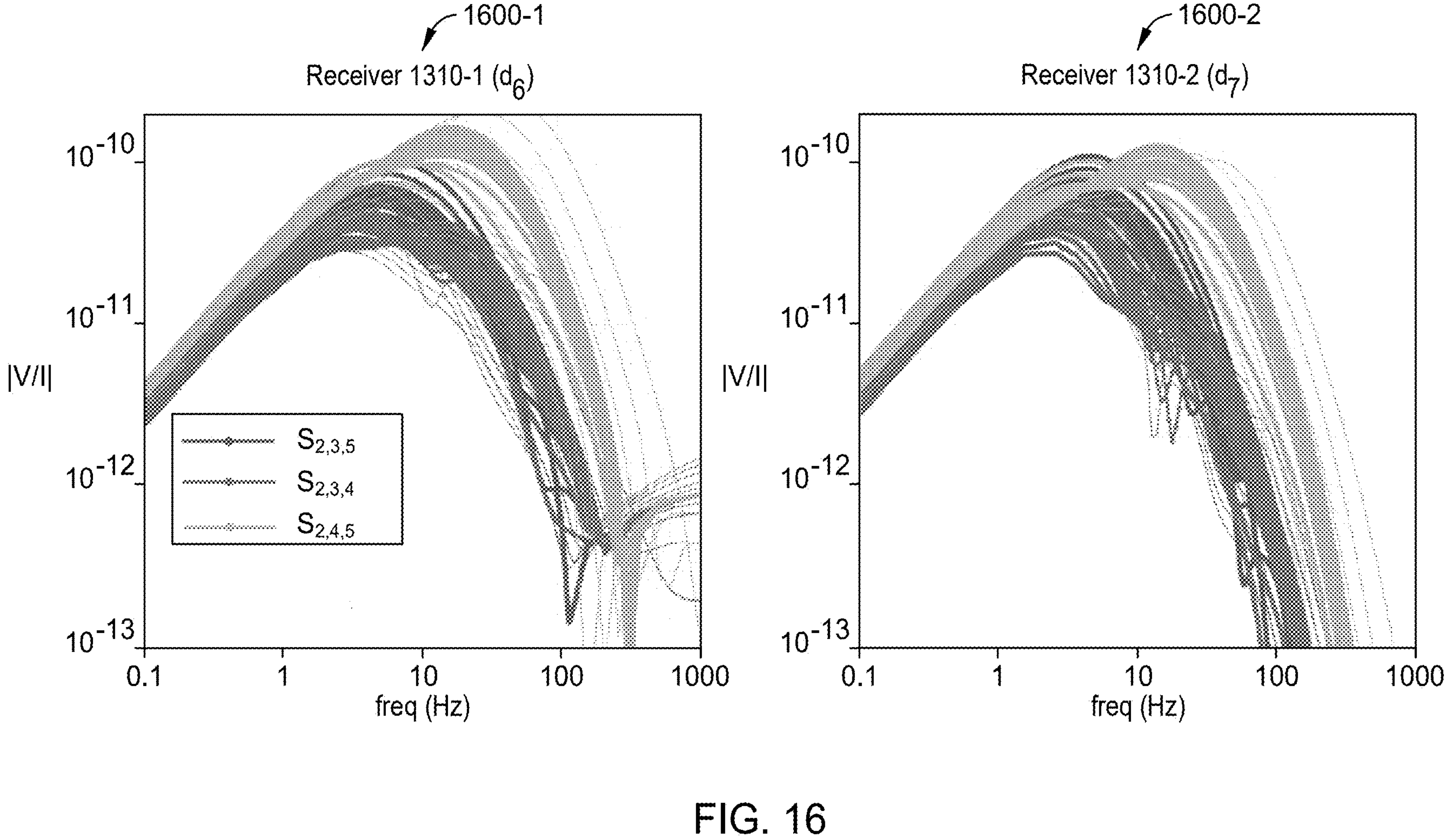
FIG. 16 depicts another set of example frequency spectrums of measured impedances for a non-collocated receiver arrangement of an EM inspection tool for different casing properties, according to various embodiments.

In another example, FIG. 16 depicts graphs 1600-1 and 1600-2 illustrating the impact of varying casing permeabilities on receivers 1310-1 and 1310-2 for three-casing combinations of $S_{2,3,5}$, $S_{2,3,4}$, and $S_{2,4,5}$. As indicated in FIG. 16, the differentiating nulls do not significantly change across varying casing permeabilities and can be used to identify the "third" casing 122 across different casing permeabilities.

Thus, as noted herein, changes in casing properties, such as relative magnetic permeability, may not have a significant impact on the null location and high frequency slopes. In cases where the null is shifted to lower frequencies for higher permeabilities and to higher frequencies for lower values, a combination of receivers can be used in numerical inversions to resolve the casing combinations.

Figure 17:
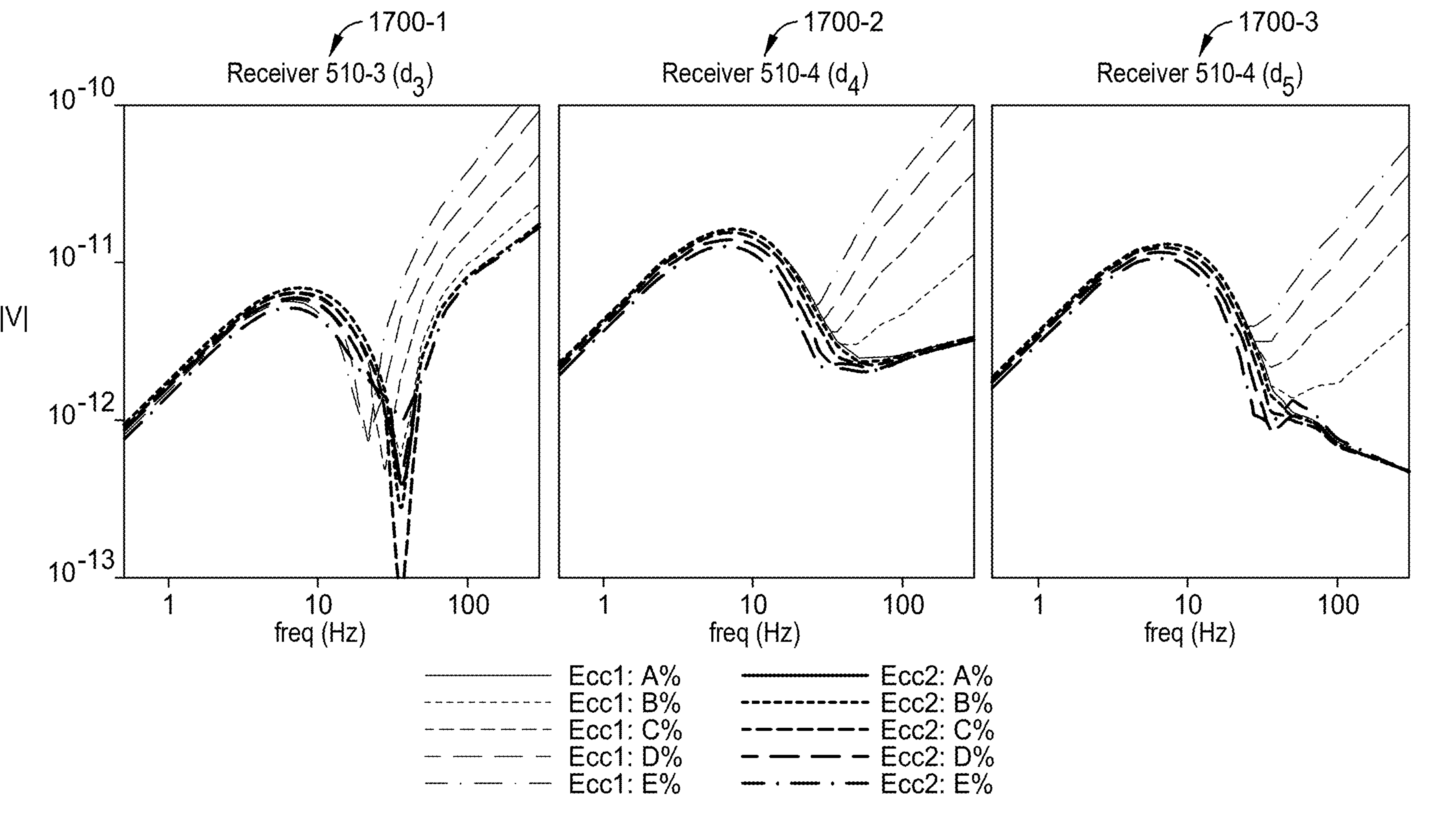
FIG. 17 depicts example frequency spectrum of measured voltages for a non-collocated receiver arrangement of an EM inspection tool for different eccentering conditions, according to various embodiments.

In certain embodiments, eccentering of the casing and/or EM inspection tool 160 may have minimal impact on outer casings 122 and some impact on inner casings 122. By way of example, FIG. 17 depicts graphs 1700-1 to 1700-3 illustrating the change in responses on receivers 510-3 to 510-5 for a "first" casing of size $S_2$ within a "second" casing of size $S_3$ for different amounts of eccentering for the "first" casing 122 (e.g., Ecc1: A %, B %, C %, D %, where A<B<C<D) and for different amounts of eccentering for the "second" casing 122 (e.g., Ecc2: A %, B %, C %, D %, where A<B<C<D). As indicated in FIG. 17, the "second" casing eccentering may have minimal impact in changing the frequency spectrum of the measured voltages. In some cases, the "first" casing eccentering may have an impact on shifting the null to lower frequencies (e.g., when the first casing eccentering is more than C %). The impact of the "first" casing eccentering on the null frequencies may be due to eccentering behaving similar to a metal gain. In such cases, the closer the EM inspection tool 160 becomes to the side of the casing 122, the more asymmetrical the distribution of the direct coupling field becomes, such that the direct reflections from the inner casing surfaces may prefer the further surfaces than the closer surfaces. Consequently, as the EM inspection tool 160 moves closer to the casing surface on a particular side (e.g., right side), the net reflection of the EM field lines may become asymmetrical, and the net effect may become more tilted towards to the other side of the casing (e.g., left side), e g., further away from the tool axis.

Figure 18:
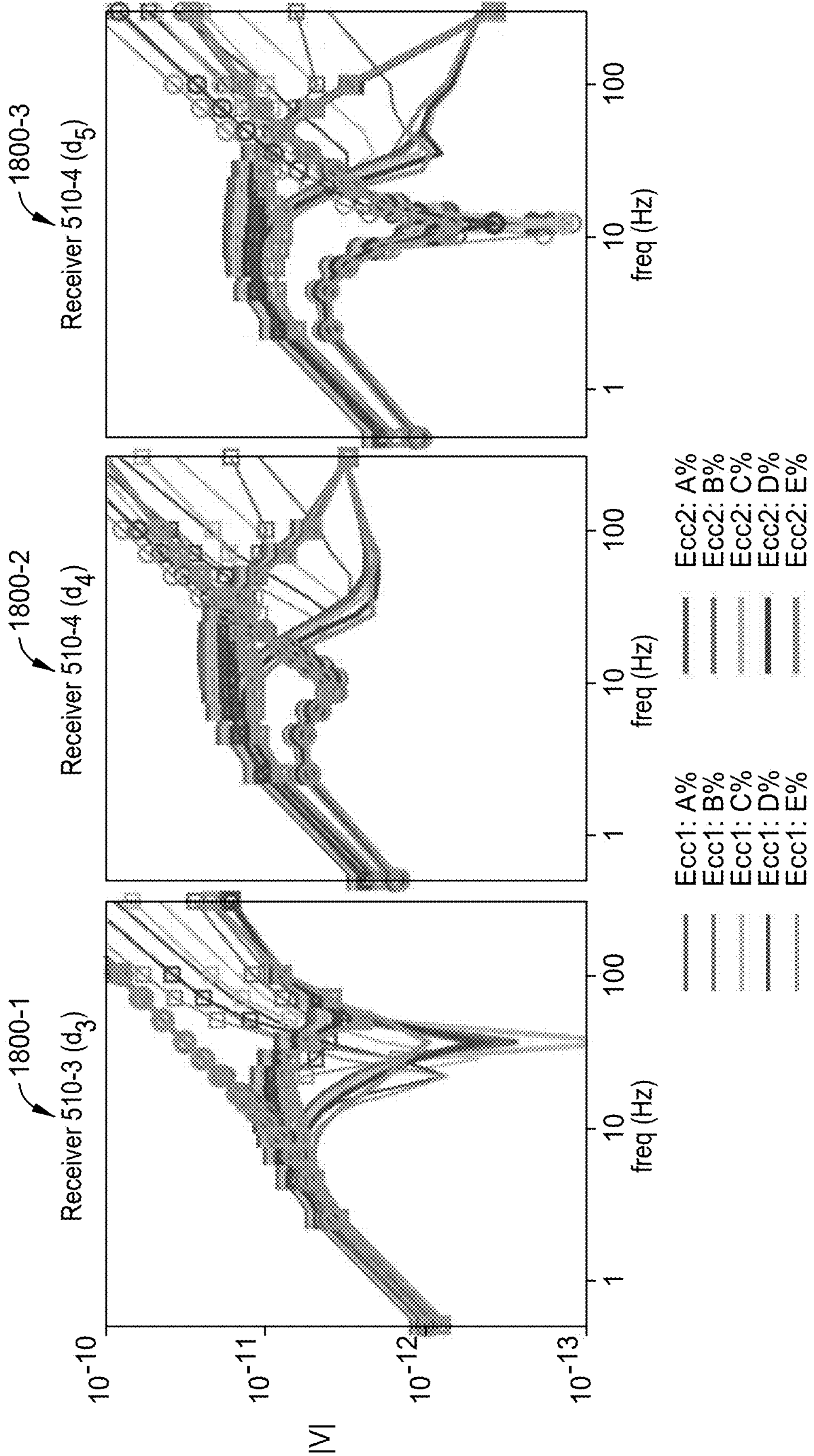
FIG. 18 depicts another set of example frequency spectrum of measured voltages for a non-collocated receiver arrangement of an EM inspection tool for different eccentering conditions, according to various embodiments.

FIG. 18 depicts graphs 1800-1 to 1800-3 illustrating the change in responses on receivers 510-3 to 510-5 for three different two-casing combinations (e.g., a casing combination of $S_{2,3}$, a casing combination of $S_{2,4}$, and a casing combination of $S_{4,5}$) for different amounts of eccentering for the "first" casing (e.g., Ecc1: A %, B %, C %, D %, where A<B<C<D) and for different amounts of eccentering for the "second" casing (e.g., Ecc2: A %, B %, C %, D %, where A<B<C<D). In FIG. 18, the casing combination of $S_{2,3}$ is indicated using straight lines, the casing combination of $S_{2,4}$ is indicated using lines with squares, and the casing combination of $S_{4,5}$ is indicated using lines with circles. As indicated in FIG. 18, even at high amounts of eccentering, each casing combination can be differentiated from the responses on the receivers 510-3 to 510-5. In some cases, the impact from the "first" casing or tool eccentering, combined with information of the null, can be resolved with methods, such as autocorrelation and inversion, as illustrative examples.

Figure 19:
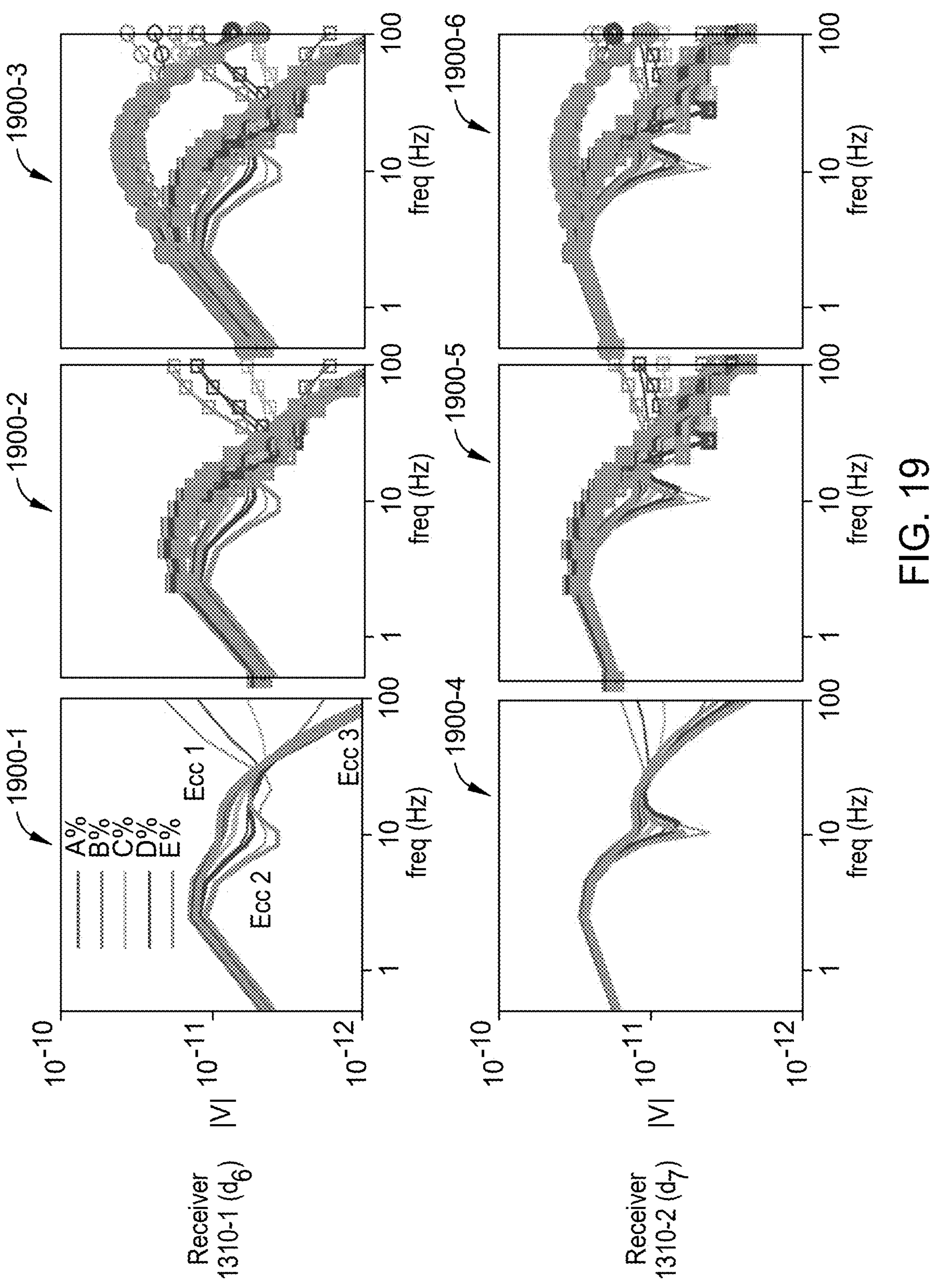
FIG. 19 depicts another set of example frequency spectrum of measured voltages for a non-collocated receiver arrangement of an EM inspection tool for different eccentering conditions, according to various embodiments.

FIG. 19 depicts graphs 1900-1 to 1900-6 illustrating the change in responses on receivers 1310-1 to 1310-2 for different three-casing combinations (e.g., a casing combination of $S_{2,3,4}$, a casing combination of $S_{2,3,5}$, and a casing combination of $S_{2,4,5}$) for different amounts of eccentering for the "first" casing (e.g., Ecc1: A %, B %, C %, D %, where A<B<C<D), different amounts of eccentering for the "second" casing (e.g., Ecc2: A %, B %, C %, D %, where A<B<C<D), and different amounts of eccentering for the "third" casing (e.g., Ecc3: A %, B %, C %, D %, where A<B<C<D). Note, graphs 1900-1 and 1900-4 indicate the respective responses on receivers 1310-1 and 1310-2 for the casing combination of $S_{2,3,4}$. Also, in FIG. 19, the casing combination of $S_{2,3,4}$ is indicated using straight lines, the casing combination of $S_{2,3,5}$ is indicated using lines with squares, and the casing combination of $S_{2,4,5}$ is indicated using lines with circles.

As indicated in FIG. 19, the "third" casing eccentering has minimal impact for the responses on receivers 1310-1 to 1310-2. The null on the receiver 1310-2 may be resilient to arbitrary casing or tool eccentering and can be used to differentiate the casing combinations (e.g., as shown in graphs 1900-2, 1900-3, 1900-5, and 1900-6).

Figure 20:
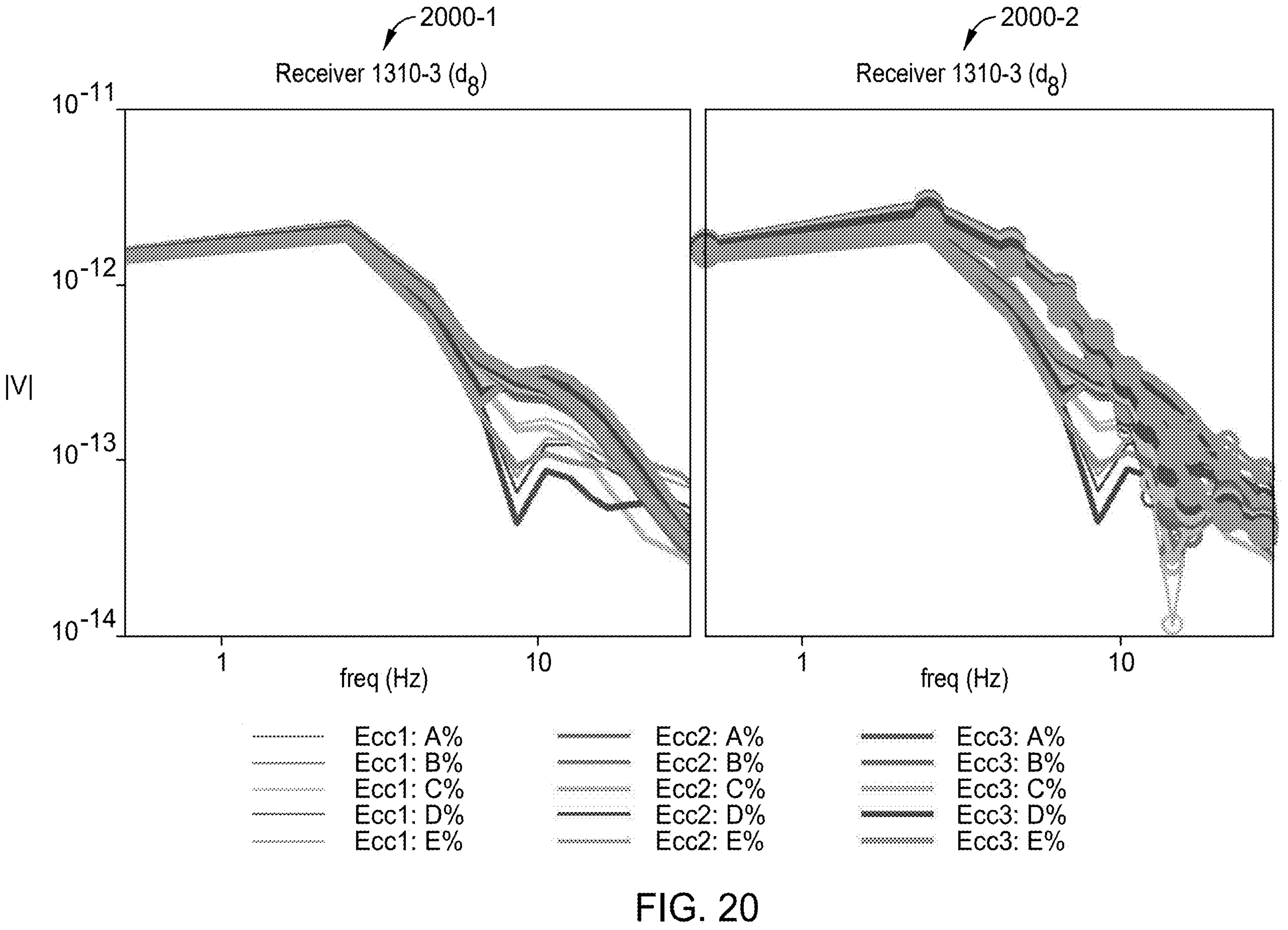
FIG. 20 depicts another set of example frequency spectrum of measured voltages for a non-collocated receiver arrangement of an EM inspection tool for different eccentering conditions, according to various embodiments.

FIG. 20 depicts graphs 2000-1 to 2000-2 illustrating the change in responses on receiver 1310-3 for different four-casing combinations (e.g., a casing combination of $S_{2,3,4,5}$ and a casing combination of $S_{2,3,4,6}$) for different amounts of eccentering for the "first" casing (e.g., Ecc1: A %, B %, C %, D %, where A<B<C<D), different amounts of eccentering for the "second" casing (e.g., Ecc2: A %, B %, C %, D %, where A<B<C<D), different amounts of eccentering for the "third" casing (e.g., Ecc3: A %, B %, C %, D %, where A<B<C<D), and different amounts of eccentering for the "fourth" casing (e.g., Ecc4: A %, B %, C %, D %, where A<B<C<D). Note, graph 2000-1 indicates the response on receiver 1310-3 for the casing combination of $S_{2,3,4,5}$. Also, in FIG. 20, the casing combination of $S_{2,3,4,5}$ is indicated using straight lines and the casing combination of $S_{2,3,4,6}$ is indicated using lines with circles.

As indicated in FIG. 20, the null appears at approximately 8 Hz. The "first" and "second" casing eccentering have a minimal impact on the shifting of the null at the spacing of receiver 1310-3, which may be in the remote field zone for the first two casings. However, for "third" and "fourth" casing eccenterings, the null may be shifted towards 6 Hz, because this spacing of receiver 1310-3 may be within the transition zone for the "third" and "fourth" casings. The differentiating null on receiver 1310-3 may be resilient to arbitrary casing or tool eccentering and can be used to differentiate the casing combinations.

Thus, as noted herein, the presence of tool eccentering may reduce the coupling of high frequency modes. In some cases, "first" casing eccentering, which may be analogous to tool eccentering, may shift the null to lower frequencies; however, there may not be a significant impact to the differentiating techniques described herein. In scenarios where there is increased ambiguity, a combination of receivers can resolve the ambiguity using methods, such as autocorrelation or inversion.

In certain embodiments, the multi-casing evaluation component 1122 evaluates multi-frequency, non-collocated, induction measurements obtained via an EM inspection tool 160 in order to determine the number of casings 122 within a well. For example, the multi-casing evaluation component 1122 can determine the number of casings 122, based on the induction measurements for one or more receivers having a spacing in the remote field zone.

In certain embodiments, the remote field zone occurs at spacings of 2 to 3 times the size (e.g., outer diameter) of the outer casing. For example, in the remote field zone, the induced secondary EM field may be stronger than the primary EM field, which scales (e.g., reduces) by $1/R^3$. The techniques described herein for determining casing count may be resilient to varying casing parameters as well as to casing or tool eccentering.

Figure 21:
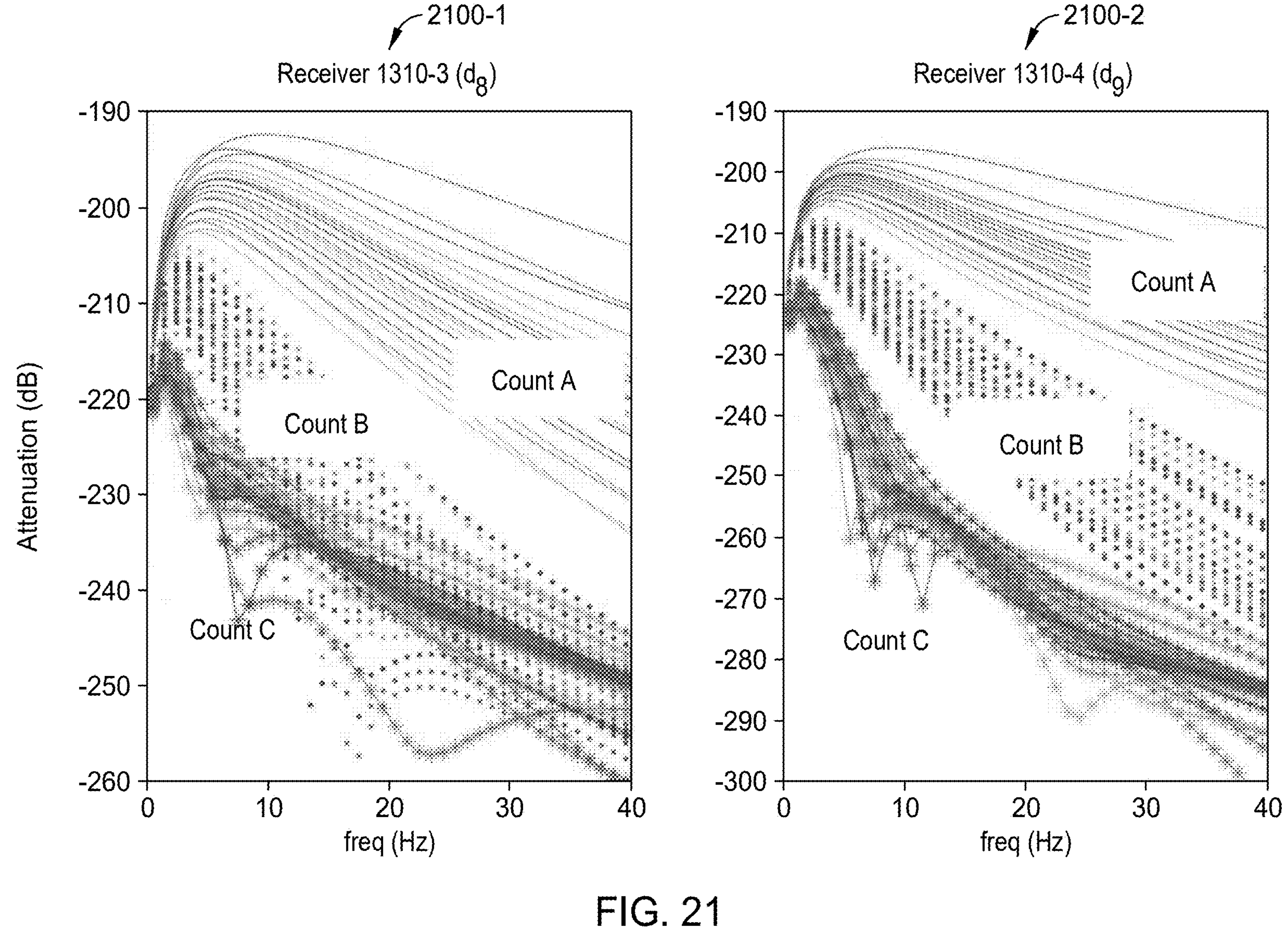
FIG. 21 depicts example attenuation of frequency responses for a non-collocated receiver arrangement of an EM inspection tool for different casing properties, according to various embodiments.

By way of example, FIG. 21 depicts graphs 2100-1 and 2100-2 illustrating attenuation responses for receivers 1310-3 and 1310-4 for different magnetic permeability for casing counts (e.g., casing count A, casing count B, and casing count C, where A<B<C), according to various embodiments. As indicated, for low frequency (e.g., less than 10 Hz) responses on receiver 1310-3, and for the complete frequency spectrum of responses on receiver 1310-4, there is a clear separation of attenuation responses across the changes in individual casing magnetic permeabilities.

Accordingly, based the attenuation responses in the remote field eddy current zone (which may occur at spacings greater than or equal to twice the maximum outer casing diameter), the number of casings in a well can be detected. Additionally, the determination of the number of casings based on the attenuation responses in the remote field zone may be resilient to tool and casing eccenterings as well as the changing casing properties (e.g., magnetic permeabilities).

Example Operations

Figure 22:
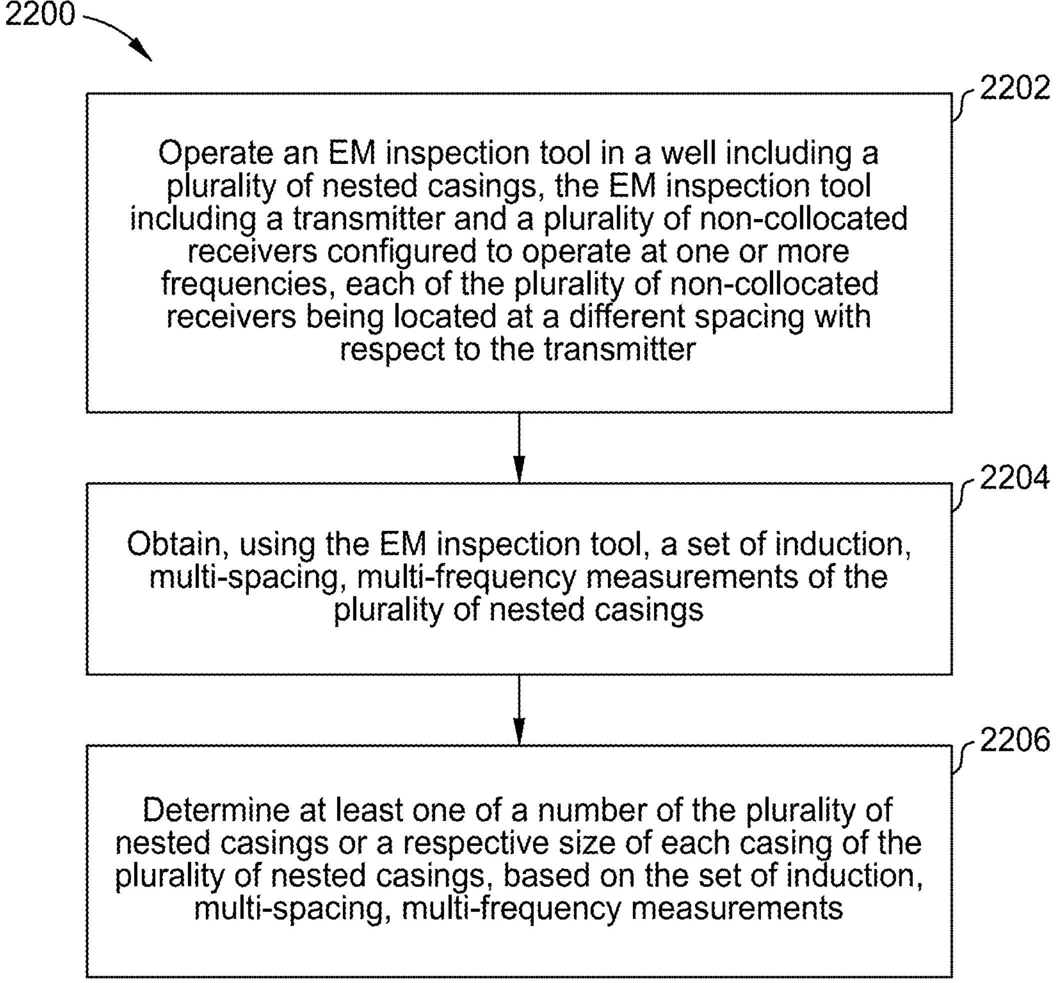
FIG. 22 is a flow diagram depicting example operations for performing a multi-casing evaluation for an EM inspection tool, according to various embodiments.

FIG. 22 is a flow diagram depicting an example operations 2200 for performing a multi-casing evaluation using multi-frequency, non-collocated, induction measurements. The operations 2200 may be performed, for example, by a multi-casing evaluation component (e.g., multi-casing evaluation component 1122). The operations 2200 may be implemented as software components that are executed and run on one or more processors (e.g., the processor 1110 of data processing system 138).

The operations 2200 may involve, at block 2202, operating (or controlling) an EM inspection tool (e.g., EM inspection tool 160) in a well (e.g., wellbore 116) including a plurality of nested casings (e.g., casings 122). The EM inspection tool may include a transmitter (e.g., transmitter 260) and a plurality of non-collocated receivers (e.g., receivers 262, 264, 266, 268, 269 of FIG. 2, receivers 510 of FIG. 5, receivers 1310 of FIG. 13, or any combination thereof) configured to operate at one or more frequencies. Each of the plurality of non-collocated receivers is located at a different spacing with respect to the transmitter.

The operations 2200 may also involve, at block 2204, obtaining, using the EM inspection tool, a set of induction, multi-spacing, multi-frequency measurements of the plurality of nested casings.

The operations 2200 may also involve, at block 2206, determining at least one of a number of the plurality of nested casings or a respective size of each casing of the plurality of nested casings, based on the set of induction, multi-spacing, multi-frequency measurements.

In certain embodiments, operating the EM inspection tool (at block 2202) may include emitting, from the transmitter of the EM inspection tool, a primary time-varying magnetic field signal towards the plurality of nested casings. The primary time-varying magnetic field signal may induce a corresponding one or more secondary time-varying magnetic field signals in the plurality of nested casings, and the one or more secondary time-varying magnetic field signals may be detected by one or more of the plurality of non-collocated receivers.

In certain embodiments, the set of induction, multi-spacing, multi-frequency measurements (in block 2204) may include, for each of the plurality of non-collocated receivers, a respective set of frequency domain responses to the primary time-varying magnetic field signal and the one or more secondary time-varying magnetic field signals.

In certain embodiments, determining the number of the plurality of nested casings (in block 2206) includes determining the number of the plurality of nested casings based on the respective set of frequency domain responses for a non-collocated receiver of the plurality of non-collocated receivers. In some embodiments, for a given frequency in the respective set of frequency domain responses for the non-collocated receiver, the number of the plurality of nested casings may be indicated by a magnitude or a phase of a corresponding frequency domain response at the frequency. In some embodiments, the spacing of the non-collocated receiver may be greater than or equal to twice a maximum size (e.g., outer diameter) of an outer casing of the plurality of nested casings. Additionally or alternatively, in some embodiments, the spacing of the non-collocated receiver may be such that the respective set of frequency domain responses for the non-collocated receiver is based on the one or more secondary time-varying magnetic field signals being greater than the primary time-varying magnetic field signal. Additionally or alternatively, in some embodiments, the non-collocated receiver may be a farthest non-collocated receiver from the transmitter among the plurality of non-collocated receivers.

In certain embodiments, determining the respective size of each casing of the plurality of nested casings (in block 2206) includes determining the size of a first casing (e.g., inner casing) of the plurality of nested casings based on the respective set of frequency domain responses for at least one first non-collocated receiver of the plurality of non-collocated receivers. In some embodiments, the spacing of the at least one first non-collocated receiver may be such that the respective set of frequency domain responses for the at least one first non-collocated receiver is based on a section of a frequency band where the primary time-varying magnetic field signal is greater than the one or more secondary time-varying magnetic field signals.

In certain embodiments, determining the respective size of each casing of the plurality of nested casings (in block 2206) further includes determining the size of a second casing (e.g., outer casing to an inner casing) based on the respective set of frequency domain responses for at least one second non-collocated receiver of the plurality of non-collocated receivers. The first casing may be nested within the second casing. In some embodiments, the spacing of the at least one second non-collocated receiver may be such that the respective set of frequency domain responses for the at least one second non-collocated receiver is based on a second of a frequency band where the primary time-varying magnetic field signal is equal to the one or more secondary time-varying magnetic field signals, creating a null response (e.g., where the magnitude response becomes minimum while the phase response changes sign) in the section of the frequency band (in the frequency spectrum of the receiver responses).

In certain embodiments, the size of the first casing may be indicated by slope of a high frequency section of a frequency band within the respective set of frequency domain responses for the at least one first non-collocated receiver where the primary time-varying magnetic field signal is greater than the one or more secondary time-varying magnetic field signals. In some embodiments, the at least one first non-collocated receiver is a shortest non-collocated receiver from the transmitter among the plurality of non-collocated receivers (e.g., the size of the first (inner) casing may be indicated by the slope of the high frequency section of the frequency domain responses of the shortest spacing receiver where the primary time-varying magnetic field signal is greater than the one or more secondary time-varying magnetic field signals). In certain embodiments, the size of the second casing may be based on a location of a null frequency within the respective set of frequency domain responses for the at least one second non-collocated receiver, where the null frequency is a lower frequency that the section of the frequency band within the respective set of frequency domain responses where the primary time-varying magnetic field signal is greater than the one or more secondary time-varying magnetic field signals.

In certain embodiments, determining the respective size of each casing of the plurality of nested casings (in block 2206) further includes determining, for each outer casing of one or more outer casings to the first and second casings, the respective size of the outer casing based on the respective sets of frequency domain responses for one or more of the plurality of non-collocated receivers. The respective size of each outer casing may be based on a location of a null frequency within at least one of the respective sets of frequency domain responses.

For example, in certain embodiments, determining the respective size of each casing of the plurality of nested casings further comprises determining the size of a third casing based on the respective sets of frequency domain responses for one or more of the plurality of non-collocated receivers, where each of the first casing and the second casing is nested within the third casing. The size of the third casing may be based on a location of a null frequency within at least one of the respective sets of frequency domain responses.

Additionally, in certain embodiments, determining the respective size of each casing of the plurality of nested casings further comprises determining the size of a fourth casing based on the respective sets of frequency domain responses for one or more of the plurality of non-collocated receivers, where each of the first casing, the second casing, and the third casing is nested within the fourth casing. The size of the fourth casing may be based on a location of a null frequency within at least one of the respective sets of frequency domain responses.

Additionally, in certain embodiments, determining the respective size of each casing of the plurality of nested casings further comprises determining the size of a fifth casing based on the respective sets of frequency domain responses for one or more of the plurality of non-collocated receivers, where each of the first casing, the second casing, the third casing, and the fourth casing is nested within the fifth casing. The size of the fifth casing may be based on a location of a null frequency within at least one of the respective sets of frequency domain responses.

Additionally, in certain embodiments, determining the respective size of each casing of the plurality of nested casings further comprises determining the size of a sixth casing based on the respective sets of frequency domain responses for one or more of the plurality of non-collocated receivers, where each of the first casing, the second casing, the third casing, the fourth casing, and the fifth casing is nested within the sixth casing. The size of the sixth casing may be based on a location of a null frequency within at least one of the respective sets of frequency domain responses.

Additionally, in certain embodiments, determining the respective size of each casing of the plurality of nested casings further comprises determining the size of a seventh casing based on the respective sets of frequency domain responses for one or more of the plurality of non-collocated receivers, where each of the first casing, the second casing, the third casing, the fourth casing, the fifth casing, and the sixth casing is nested within the seventh casing. The size of the seventh casing may be based on a location of a null frequency within at least one of the respective sets of frequency domain responses.

Figure 23:
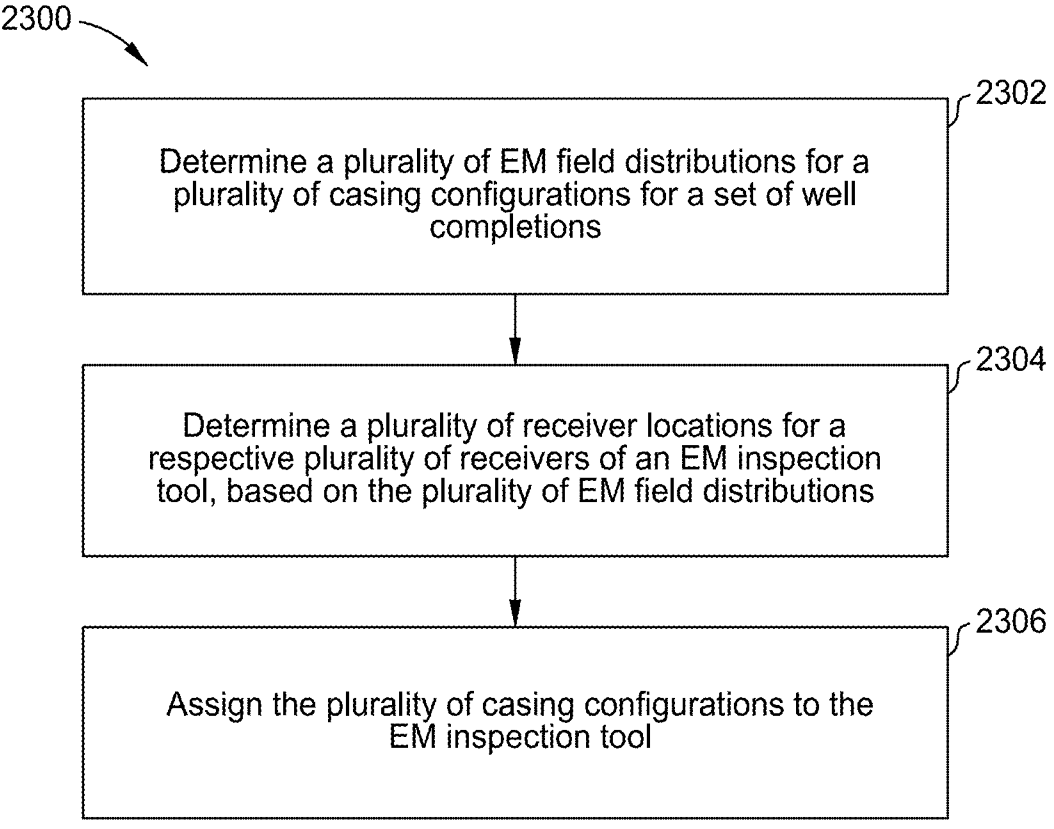
FIG. 23 is a flow diagram depicting example operations for determining sensor placement and frequency selection for an EM inspection tool, according to various embodiments.

FIG. 23 is a flow diagram depicting an example operations 2300 for determining sensor placement and frequency selection for an EM inspection tool. The operations 2300 may be performed, for example, by a tool design component (e.g., tool design component 1162). The operations 2300 may be implemented as software components that are executed and run on one or more processors (e.g., the processor 1150 of computing system 1115).

The operations 2300 may involve, at block 2302, determining a plurality of EM field distributions for a plurality of casing configurations for a set of well completions. The set of well completions may include a set of arbitrary well completions.

The operations 2300 may also involve, at block 2304, determining a plurality of receiver locations for a respective plurality of receivers (e.g., receivers 262, 264, 266, 268, 269 of FIG. 2, receivers 510 of FIG. 5, receivers 1300 of FIG. 13, or any combination thereof) of an EM inspection tool (e.g., EM inspection tool 160), based on the plurality of EM field distributions.

The operations 2300 may further involve, at block 2306, assigning the plurality of casing configurations to the EM inspection tool.

In certain embodiments, the plurality of EM field distributions include an indication of a plurality of primary time-varying magnetic fields and an indication of a plurality of secondary time-varying magnetic fields, induced by the plurality of time-varying magnetic fields, for one or more frequencies.

In certain embodiments, determining the plurality of receiver locations includes determining a set of receiver locations, such that a frequency domain response of a respective spacing of each of the set of receiver locations with respect to a transmitter (e.g., transmitter 260) for the EM inspection tool includes a section of frequency band which is associated with the plurality of secondary time-varying magnetic fields being greater than the plurality of primary time-varying magnetic fields.

In certain embodiments, determining the plurality of receiver locations includes determining a set of receiver locations, such that a frequency domain response of a respective spacing of each of the set of receiver locations with respect to a transmitter for the EM inspection tool includes a section of frequency band which is associated with the plurality of secondary time-varying magnetic fields being equal to the plurality of primary time-varying magnetic fields, constituting a null response for at least one of the plurality of casing configurations at that spacing.

In certain embodiments, determining the plurality of receiver locations includes determining a set of receiver locations, such that a frequency domain response of a respective spacing of each of the set of receiver locations with respect to a transmitter for the EM inspection tool incudes a section of frequency band which is associated with the plurality of primary time-varying magnetic fields being greater than the plurality of secondary time-varying magnetic fields.

Example Clauses

Implementation examples are described in the following numbered clauses:

Clause 1: A method comprising: operating an electromagnetic (EM) inspection tool in a well comprising a plurality of nested casings, the EM inspection tool comprising a transmitter and a plurality of non-collocated receivers configured to operate at one or more frequencies, each of the plurality of non-collocated receivers being located at a different spacing with respect to the transmitter; obtaining, using the EM inspection tool, a set of induction, multi-spacing, multi-frequency measurements of the plurality of nested casings; and determining at least one of a number of the plurality of nested casings or a respective size of each casing of the plurality of nested casings, based on the set of induction, multi-spacing, multi-frequency measurements.

Clause 2: The method of Clause 1, wherein operating the EM inspection tool comprises emitting, from the transmitter of the EM inspection tool, a primary time-varying magnetic field signal towards the plurality of nested casings, the primary time-varying magnetic field signal inducing a corresponding one or more secondary time-varying magnetic field signals in the plurality of nested casings, and the one or more secondary time-varying magnetic field signals being detected by one or more of the plurality of non-collocated receivers.

Clause 3: The method of Clause 2, wherein the set of induction, multi-spacing, multi-frequency measurements comprise, for each of the plurality of non-collocated receivers, a respective set of frequency domain responses to the primary time-varying magnetic field signal and the one or more secondary time-varying magnetic field signals.

Clause 4: The method of Clause 3, wherein determining the number of the plurality of nested casings comprises determining the number of the plurality of nested casings based on the respective set of frequency domain responses for a non-collocated receiver of the plurality of non-collocated receivers.

Clause 5: The method of Clause 4, wherein the spacing of the non-collocated receiver with respect to the transmitter is greater than or equal to twice a maximum size of an outer casing of the plurality of nested casings.

Clause 6: The method according to any of Clauses 4-5, wherein the spacing of the non-collocated receiver is such that the respective set of frequency domain responses for the non-collocated receiver is based on the one or more secondary time-varying magnetic field signals being greater than the primary time-varying magnetic field signal.

Clause 7: The method according to any of Clauses 4-6, wherein the non-collocated receiver is a farthest non-collocated receiver from the transmitter among the plurality of non-collocated receivers.

Clause 8: The method according to any of Clauses 4-7, wherein, for a given frequency in the respective set of frequency domain responses for the non-collocated receiver, the number of the plurality of nested casings is indicated by a magnitude or a phase of a corresponding frequency domain response at the frequency.

Clause 9: The method according to any of Clauses 3-8, wherein determining the respective size of each casing of the plurality of nested casings comprises determining the size of a first casing of the plurality of nested casings based on the respective set of frequency domain responses for at least one first non-collocated receiver of the plurality of non-collocated receivers.

Clause 10: The method of Clause 9, wherein the spacing of the at least one first non-collocated receiver is such that the respective set of frequency domain responses for the at least one first non-collocated receiver is based on a section of a frequency band where the primary time-varying magnetic field signal is greater than the one or more secondary time-varying magnetic field signals.

Clause 11: The method according to any of Clauses 9-10, wherein: determining the respective size of each casing of the plurality of nested casings further comprises determining the size of a second casing of the plurality of nested casings based on the respective set of frequency domain responses for at least one second non-collocated receiver of the plurality of non-collocated receivers; and the first casing is nested within the second casing.

Clause 12: The method of Clause 11, wherein the spacing of the at least one second non-collocated receiver is such that the respective set of frequency domain responses for the at least one second non-collocated receiver is based on a section of a frequency band where the primary time-varying magnetic field signal is equal to the one or more secondary time-varying magnetic field signals creating a null response in the section of the frequency band.

Clause 13: The method according to any of Clauses 9-12, wherein the size of the first casing is indicated by slope of a section of a frequency band within the respective set of frequency domain responses for the at least one first non-collocated receiver where the primary time-varying magnetic field signal is greater than the one or more secondary time-varying magnetic field signals.

Clause 14: The method according to any of Clauses 9-13, wherein the at least one first non-collocated receiver is a shortest non-collocated receiver from the transmitter among the plurality of non-collocated receivers.

Clause 15: The method according to any of Clauses 11-14, wherein the size of the second casing is based on a location of a null frequency within the respective set of frequency domain responses for the at least one second non-collocated receiver, the null frequency being at a lower frequency than the section of the frequency band.

Clause 16: The method according to any of Clauses 11-15, wherein: determining the respective size of each casing of the plurality of nested casings further comprises determining, for each outer casing of one or more outer casings to the first and second casings, the respective size of the outer casing based on the respective sets of frequency domain responses for one or more of the plurality of non-collocated receivers; and the respective size of each outer casing is based on a location of a null frequency within at least one of the respective sets of frequency domain responses.

Clause 17: A method comprising: determining a plurality of electromagnetic (EM) field distributions for a plurality of casing configurations for a set of well completions; determining a plurality of receiver locations for a respective plurality of receivers of an EM inspection tool, based on the plurality of EM field distributions; and assigning the plurality of casing configurations to the EM inspection tool.

Clause 18: The method of Clause 17, wherein the plurality of EM field distributions comprise an indication of a plurality of primary time-varying magnetic fields and an indication of a plurality of secondary time-varying magnetic fields, induced by the plurality of time-varying magnetic fields, for one or more frequencies.

Clause 19: The method of Clause 18, wherein determining the plurality of receiver locations comprises determining a set of receiver locations, such that a frequency domain response of a respective spacing of each of the set of receiver locations with respect to a transmitter for the EM inspection tool comprises a section of frequency band which is associated with the plurality of secondary time-varying magnetic fields being greater than the plurality of primary time-varying magnetic fields.

Clause 20: The method according to any of Clauses 18-19, wherein determining the plurality of receiver locations comprises determining a set of receiver locations, such that a frequency domain response of a respective spacing of each of the set of receiver locations with respect to a transmitter for the EM inspection tool comprises a section of frequency band which is associated with the plurality of secondary time-varying magnetic fields being equal to the plurality of primary time-varying magnetic fields, constituting a null response for at least one of the plurality of casing configurations at that spacing.

Clause 21: The method according to any of Clauses 18-20, wherein determining the plurality of receiver locations comprises determining a set of receiver locations, such that a frequency domain response of a respective spacing of each of the set of receiver locations with respect to a transmitter for the EM inspection tool comprises a section of frequency band which is associated with the plurality of primary time-varying magnetic fields being greater than the plurality of secondary time-varying magnetic fields.

Clause 22: A system comprising: a plurality of nested casings disposed in a well; an electromagnetic (EM) inspection tool disposed in the plurality of nested casings, wherein the EM inspection tool comprises a transmitter and a plurality of non-collocated receivers, each of the plurality of non-collocated receivers being located at a different spacing with respect to the transmitter; and a control system communicatively coupled to the EM inspection tool, the control system comprising: one or more memories collectively storing instructions; and one or more processors coupled to the one or more memories, the one or more processors being collectively configured to execute the instructions to cause the control system to perform an operation comprising: obtaining, using the EM inspection tool, a set of induction, multi-spacing, multi-frequency measurements of the plurality of nested casings; and determining at least one of a number of the plurality of nested casings or a respective size of each casing of the plurality of nested casings, based on the set of induction, multi-spacing, multi-frequency measurements.

Clause 23: A computing system comprising: one or more memories collectively storing executable instructions; and one or more processors coupled to the one or more memories, the one or more processors being collectively configured to execute the executable instructions and cause the computing system to perform a method in accordance with any of Clauses 1-16.

Clause 24: A computing system comprising: one or more memories collectively storing executable instructions; and one or more processors coupled to the one or more memories, the one or more processors being collectively configured to execute the executable instructions and cause the computing system to perform a method in accordance with any of Clauses 17-21.

Clause 25: An apparatus comprising means for performing a method in accordance with any of Clauses 1-16.

Clause 26: An apparatus comprising means for performing a method in accordance with any of Clauses 17-21.

Clause 27: A non-transitory computer-readable medium comprising computer-executable instructions that, when executed by one or more processors of a computing system, cause the computing system to perform a method in accordance with any of Clauses 1-16.

Clause 28: A non-transitory computer-readable medium comprising computer-executable instructions that, when executed by one or more processors of a computing system, cause the computing system to perform a method in accordance with any of Clauses 17-21.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the general principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the embodiments set forth herein. In addition, the scope of the disclosure is intended to cover such an apparatus or method that is practiced using other structure, functionality, or structure and functionality in addition to, or other than, the various embodiments of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, "a processor," "at least one processor," or "one or more processors" generally refer to a single processor configured to perform one or multiple operations or multiple processors configured to collectively perform one or more operations. In the case of multiple processors, performance of the one or more operations could be divided amongst different processors, though one processor may perform multiple operations, and multiple processors could collectively perform a single operation. Similarly, "a memory," "at least one memory," or "one or more memories" generally refer to a single memory configured to store data and/or instructions or multiple memories configured to collectively store data and/or instructions.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A method comprising:

operating an electromagnetic (EM) inspection tool in a well comprising a plurality of nested casings, the EM inspection tool comprising a transmitter and a plurality of non-collocated receivers configured to operate at one or more frequencies, each of the plurality of non-collocated receivers being located at a different spacing with respect to the transmitter;

obtaining, using the EM inspection tool, a set of induction, multi-spacing, multi-frequency measurements of the plurality of nested casings; and determining at least one of a number of the plurality of nested casings or a respective size of each casing of the plurality of nested casings, based on the set of induction, multi-spacing, multi-frequency measurements, wherein operating the EM inspection tool comprises emitting, from the transmitter of the EM inspection tool, a primary time-varying magnetic field signal towards the plurality of nested casings, the primary time-varying magnetic field signal inducing a corresponding one or more secondary time-varying magnetic field signals in the plurality of nested casings, and the one or more secondary time-varying magnetic field signals being detected by one or more of the plurality of non-collocated receivers, wherein the set of induction, multi-spacing, multi-frequency measurements comprise, for each of the plurality of non-collocated receivers, a respective set of frequency domain responses to the primary time-varying magnetic field signal and the one or more secondary time-varying magnetic field signals, wherein determining the respective size of each casing of the plurality of nested casings comprises determining the size of a first casing of the plurality of nested casings based on the respective set of frequency domain responses for at least one first non-collocated receiver of the plurality of non-collocated receivers, and wherein the spacing of the at least one first non-collocated receiver is such that the respective set of frequency domain responses for the at least one first non-collocated receiver is based on a section of a frequency band where the primary time-varying magnetic field signal is greater than the one or more secondary time-varying magnetic field signals.

2. The method of claim 1, wherein determining the number of the plurality of nested casings comprises determining the number of the plurality of nested casings based on the respective set of frequency domain responses for a second non-collocated receiver of the plurality of non-collocated receivers.

3. The method of claim 2, wherein the spacing of the second non-collocated receiver with respect to the transmitter is greater than or equal to twice a maximum size of an outer casing of the plurality of nested casings.

4. The method of claim 2, wherein the spacing of the second non-collocated receiver is such that the respective set of frequency domain responses for the second non-collocated receiver is based on the one or more secondary time-varying magnetic field signals being greater than the primary time-varying magnetic field signal.

5. The method of claim 2, wherein the second non-collocated receiver is a farthest non-collocated receiver from the transmitter among the plurality of non-collocated receivers.

6. The method of claim 2, wherein, for a given frequency in the respective set of frequency domain responses for the second non-collocated receiver, the number of the plurality of nested casings is indicated by a magnitude or a phase of a corresponding frequency domain response at the frequency.

7. The method of claim 1, wherein:

determining the respective size of each casing of the plurality of nested casings further comprises determining the size of a second casing of the plurality of nested casings based on the respective set of frequency domain responses for at least one second non-collocated receiver of the plurality of non-collocated receivers; and the first casing is nested within the second casing.

8. The method of claim 7, wherein the spacing of the at least one second non-collocated receiver is such that the respective set of frequency domain responses for the at least one second non-collocated receiver is based on a section of a frequency band where the primary time-varying magnetic field signal is equal to the one or more secondary time-varying magnetic field signals creating a null response in the section of the frequency band.

9. The method of claim 7, wherein the size of the first casing is indicated by a slope of a section of a frequency band within the respective set of frequency domain responses for the at least one first non-collocated receiver where the primary time-varying magnetic field signal is greater than the one or more secondary time-varying magnetic field signals.

10. The method of claim 9, wherein the at least one first non-collocated receiver is a shortest non-collocated receiver from the transmitter among the plurality of non-collocated receivers.

11. The method of claim 9, wherein the size of the second casing is based on a location of a null frequency within the respective set of frequency domain responses for the at least one second non-collocated receiver, the null frequency being at a lower frequency than the section of the frequency band.

12. The method of claim 7, wherein:

determining the respective size of each casing of the plurality of nested casings further comprises determining, for each outer casing of one or more outer casings to the first and second casings, the respective size of the outer casing based on the respective sets of frequency domain responses for one or more of the plurality of non-collocated receivers; and the respective size of each outer casing is based on a location of a null frequency within at least one of the respective sets of frequency domain responses.

13. A system comprising:

a plurality of nested casings disposed in a well;

an electromagnetic (EM) inspection tool disposed in the plurality of nested casings, wherein the EM inspection tool comprises a transmitter and a plurality of non-collocated receivers, each of the plurality of non-collocated receivers being located at a different spacing with respect to the transmitter; and a control system communicatively coupled to the EM inspection tool, the control system comprising:

one or more memories collectively storing instructions; and one or more processors coupled to the one or more memories, the one or more processors being collectively configured to execute the instructions to cause the control system to perform an operation comprising:

emitting, from the transmitter of the EM inspection tool, a primary time-varying magnetic field signal towards the plurality of nested casings, the primary time-varying magnetic field signal inducing a corresponding one or more secondary time-varying magnetic field signals in the plurality of nested casings, and the one or more secondary time-varying magnetic field signals being detected by one or more of the plurality of non-collocated receivers;

obtaining, using the EM inspection tool, a set of induction, multi-spacing, multi-frequency measurements of the plurality of nested casings; and determining at least one of a number of the plurality of nested casings or a respective size of each casing of the plurality of nested casings, based on the set of induction, multi-spacing, multi-frequency measurements, wherein the set of induction, multi-spacing, multi-frequency measurements comprise, for each of the plurality of non-collocated receivers, a respective set of frequency domain responses to the primary time-varying magnetic field signal and the one or more secondary time-varying magnetic field signals, wherein determining the respective size of each casing of the plurality of nested casings comprises determining the size of a first casing of the plurality of nested casings based on the respective set of frequency domain responses for at least one first non-collocated receiver of the plurality of non-collocated receivers, and wherein the spacing of the at least one first non-collocated receiver is such that the respective set of frequency domain responses for the at least one first non-collocated receiver is based on a section of a frequency band where the primary time-varying magnetic field signal is greater than the one or more secondary time-varying magnetic field signals.

14. The system of claim 13, wherein:

the operation further comprises determining the respective size of each casing of the plurality of nested casings further comprises determining the size of a second casing of the plurality of nested casings based on the respective set of frequency domain responses for at least one second non-collocated receiver of the plurality of non-collocated receivers; and the first casing is nested within the second casing.

15. The system of claim 14, wherein the spacing of the at least one second non-collocated receiver is such that the respective set of frequency domain responses for the at least one second non-collocated receiver is based on a section of a frequency band where the primary time-varying magnetic field signal is equal to the one or more secondary time-varying magnetic field signals creating a null response in the section of the frequency band.

16. The system of claim 14, wherein the size of the first casing is indicated by a slope of a section of a frequency band within the respective set of frequency domain responses for the at least one first non-collocated receiver where the primary time-varying magnetic field signal is greater than the one or more secondary time-varying magnetic field signals.

17. The system of claim 16, wherein the at least one first non-collocated receiver is a shortest non-collocated receiver from the transmitter among the plurality of non-collocated receivers.

18. The system of claim 16, wherein the size of the second casing is based on a location of a null frequency within the respective set of frequency domain responses for the at least one second non-collocated receiver, the null frequency being at a lower frequency than the section of the frequency band.

19. The system of claim 14, wherein:

the operation further comprises determining the respective size of each casing of the plurality of nested casings further comprises determining, for each outer casing of one or more outer casings to the first and second casings, the respective size of the outer casing based on the respective sets of frequency domain responses for one or more of the plurality of non-collocated receivers; and the respective size of each outer casing is based on a location of a null frequency within at least one of the respective sets of frequency domain responses.

* * * * *